US012801598B2

(12) United States Patent
Vu et al.

(10) Patent No.: US 12,801,598 B2
(45) Date of Patent: Nov. 17, 2026

(54) EXECUTION AND SEMANTIC ERROR CORRECTION CAPABILITIES FOR NATURAL LANGUAGE TO LOGICAL FORM MODEL

(71) Applicant: Oracle International Corporation, Redwood Shores, CA (US)

(72) Inventors: Duy Vu, Melbourne (AU); Steve Wai-Chun Siu, Melbourne (AU); Gioacchino Tangari, Sydney (AU); Cong Duy Vu Hoang, Melbourne (AU); Vladislav Blinov, Melbourne (AU); Yakupitiyage Don Thanuja Samodhve Dharmasiri, Melbourne (AU); Ying Xu, Albion (AU); Thanh Long Duong, Melbourne (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 122 days.

(21) Appl. No.: 18/788,732

(22) Filed: Jul. 30, 2024

(65) Prior Publication Data

US 2026/0037505 A1 Feb. 5, 2026

(51) Int. Cl.

| | |
|---|---|
| ***G06F 16/2452*** | (2019.01) |
| ***G06F 16/242*** | (2019.01) |
| ***G06F 40/30*** | (2020.01) |

(52) U.S. Cl.

CPC .... *G06F 16/24522* (2019.01); *G06F 16/2423* (2019.01); *G06F 40/30* (2020.01)

(58) Field of Classification Search

None

See application file for complete search history.

(56) References Cited

U.S. PATENT DOCUMENTS

2022/0309106 A1* 9/2022 Ramos et al. .... G06F 16/90332
2024/0062044 A1 2/2024 Subramanian et al.
2025/0147956 A1* 5/2025 Payani et al. ..... G06F 16/24522

OTHER PUBLICATIONS

Liu et al. "EPI-SQL: Enhancing Text-to-SQL Translation with Error-Prevention", (Apr. 21, 2024).*

(Continued)

*Primary Examiner* — Paras D Shah
*Assistant Examiner* — Nicholas D Lowen
(74) *Attorney, Agent, or Firm* — Kilpatrick Townsend & Stockton LLP

(57) ABSTRACT

Techniques are disclosed herein for providing and using a natural language to logical form model having execution and sematic error correction capabilities. In one aspect, a method is disclosed that includes: accessing a set of training examples and generating a set of error correction training examples via an iterative process performed for each training example. The iterative process includes generating an inferred logical form, executing the inferred logical form on a database, when executing the inferred logical form on the database fails, obtaining an execution error message corresponding to the failure, and recording the inferred logical form and the execution error message as part of an execution error example, and populating an error correction prompt template with the execution error example to generate an error correction training example. A machine learning model may then be trained with at least the set of error correction training examples.

11 Claims, 10 Drawing Sheets

(56) References Cited

OTHER PUBLICATIONS

Roberson et al. "Analyzing the Effectiveness of Large Language Models on Text-to-SQL Synthesis", (Jan. 22, 2024).*
Tai et al. "Exploring Chain of Thought Style Prompting for Text-to-SQL", (Oct. 27, 2023).*
An et al., "Learning From Mistakes Makes LLM Better Reasoner", IAIR, Xi'an Jiaotong University, Microsoft Corporation, Peking University, Preprint, Mar. 29, 2024, 23 pages.
Panda et al., "Build a robust text-to-SQL solution generating complex queries, self-correcting, and querying diverse data sources", AWS Machine Learning Blog, Feb. 28, 2024, 12 pages.
Gou et al., "CRITIC: Large Language Models Can Self-Correct With Tool-Interactive Critiquing", Published as a conference paper at ICLR 2024, Feb. 21, 2024, 78 pages.
Askari, et al., "Magic: Generating Self-correction Guideline for in-context Text-to-SQL", Available online at: arXiv:2406.12692 [cs.CL], Dec. 21, 2024, 18 pages.
International Application No. PCT/US2025/039676, International Search Report and Written Opinion mailed Dec. 11, 2025, 13 pages.
Zhang, et al., "SQLfuse: Enhancing Text-to-SQL Performance through Comprehensive LLM Synergy", Available online at: arXiv:2407.14568 [cs.CL], Jul. 19, 2024, 13 pages.

* cited by examiner

EXECUTION AND SEMANTIC ERROR CORRECTION CAPABILITIES FOR NATURAL LANGUAGE TO LOGICAL FORM MODEL

FIELD

The present disclosure relates generally to transforming natural language to a logical form, and more particularly, to techniques for providing and using a natural language to logical form model having execution and sematic error correction capabilities.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Artificial intelligence-based solutions, such as chatbots, may have both analog (human) and digital (machine) interfaces for interacting with a human and connecting to a backend system. It is advantageous to be able to extract and analyze the meaning of an utterance (e.g., a request) when a human makes one using natural language, independent of how a backend system will handle the utterance. As an example, a request might be for data that needs to be retrieved from a relational database, or the requested data might need to be extracted from a knowledge graph. A meaning representation language (MRL) is a versatile representation of a natural language utterance that a chatbot can translate into any number of target machine-oriented languages. As such, an MRL can be utilized by a chatbot to communicate interchangeably with both a human and various backend systems, including systems that communicate using Structured Query Language (SQL), Application Programming Interfaces (APIs), REpresentational State Transfer (REST), Graph Query Language (GraphQL), Property Graph Query Language (PGQL), etc.

For example, SQL is a standard database management language for interacting with relational databases. SQL can be used for storing, manipulating, retrieving, and/or otherwise managing data held in a relational database management system (RDBMS) and/or for stream processing in a relational data stream management system (RDSMS). SQL includes statements or commands that are used to interact with relational databases. SQL statements or commands are classified into, among others, data query language (DQL) statements, data definition language (DDL) statements, data control language (DCL) statements, and data manipulation language (DML) statements. To interact with relational databases using SQL, users must know how the database is structured (e.g., knowledge of the tables and rows and columns within each table), SQL syntax, and how to relate the syntax to the database structure. Without this knowledge, users often have difficultly using SQL to interact with these relational databases.

Natural language interfaces to databases (NLIDB) provide users with a means to interact with these relational databases in an intuitive way without requiring knowledge of a particular database management language. For example, using NLIDB, users can interact with these relational databases using natural language statements and queries (i.e., using plain language). Recently, text-to-SQL systems have become popular and deep learning approaches to converting natural language queries to SQL queries have proved promising. Using semantic parsing, natural language statements, queries, requests, and questions (i.e., sentences) can be transformed into a machine-oriented language that can be executed by an application (e.g., chatbot, model, program, machine, etc.). For example, semantic parsing can transform natural language sentences into general purpose programming languages such as Python, Java, and SQL. Processes for transforming natural language sentences to SQL queries typically include rule-based, statistical-based, and/or deep learning-based systems. Rule-based systems typically use a series of fixed rules to translate the natural language sentences to SQL queries. These rule-based systems are generally domain-specific and, thus, are considered inelastic and do not generalize well to new use cases (e.g., across different domains). Statistical-based systems, such as slot-filling, label tokens (i.e., words or phrases) in an input natural language sentence according to their semantic role in the sentence and use the labels to fill slots in the SQL query. Generally, these statistical-based systems have limitations on the types of sentences that can be parsed (e.g., a sentence must be able to be represented as a parse tree). Deep-learning based systems, such as sequence-to-sequence models or large language models, involve training deep-learning models that directly translate the natural language sentences to machine-oriented languages and have been shown to generalize across tasks, domains, and datasets. Despite their advancements, deep learning approaches to text-to-SQL systems often struggle with understanding complex, ambiguous, or context-specific queries, leading to inaccurate SQL translations.

BRIEF SUMMARY

Techniques are disclosed herein for providing and using a natural language to logical form model having execution and sematic error correction capabilities.

In various embodiments, a computer-implemented method includes accessing a set of training examples, where each training example of the set of training examples comprises a natural language utterance, a gold logical form corresponding to the natural language utterance, and database schema information; generating a set of error correction training examples based on the set of training examples, wherein generating the set of error correction training examples comprises performing an iterative process for each training example of the set of training examples, and wherein the iterative process comprises: generating, by a text-to-logical form model, an inferred logical form based on the natural language utterance and the database schema information, executing the inferred logical form on a database corresponding to the database schema information, when executing the inferred logical form on the database fails, obtaining an execution error message corresponding to the failure, and recording the natural language utterance, the gold logical form, the database schema information, the inferred logical form, and the execution error message as an execution error example, and populating an error correction prompt template with the execution error example to generate an error correction training example; and training a machine learning model with the set of training examples and the set of error correction training examples to generate a trained machine learning model.

In some embodiments, the iterative process further comprises: when executing the inferred logical form on the database succeeds, obtaining an inferred result, executing the gold logical form on the database corresponding to the database schema information to obtain a gold result, and comparing the inferred result to the gold result; when the inferred result and the gold result are dissimilar, generating an error message corresponding to the dissimilarity, and recording the natural language utterance, the gold logical form, the database schema information, the inferred logical form, and the error message as a semantic error example; and populating the error correction prompt template with the semantic error example to generate an error correction training example.

In some embodiments, the iterative process further comprises: populating an error correction instruction prompt template with the semantic error example to generate an error correction instruction example; generating, by a large language model, error correction instructions based on the error correction instruction example; recording the natural language utterance, the gold logical form, the database schema information, the inferred logical form, the semantic error message, and the error correction instructions as an enhanced semantic error example; and populating the error correction prompt template with the enhanced semantic error example to generate an error correction training example.

In some embodiments, the iterative process further comprises: appending a text-to-logical form prompt template with the error correction instructions to generate an enhanced text-to-logical form prompt template; generating, by the text-to-logical form model, random logical forms based on the text-to-logical form prompt template; executing each of the random logical forms on a database corresponding to the database schema information to obtain a result for each of the random logical forms; comparing the result for each of the random logical forms to the gold result; and when a proportion of the results that are similar or the same to the gold result based on the comparing is greater than or equal to a predetermined threshold, the gold logical form, the database schema information, the inferred logical form, the semantic error message, and the error correction instructions are recorded as the enhanced semantic error example.

In some embodiments, the training examples in the set of training examples are selected randomly from a batch of text-to-logical form examples; and the set of training examples is a subset of the batch of text-to-logical form examples.

In some embodiments, the machine learning model is a large language model pretrained for a task of converting an input natural language utterance to an output logical form.

In some embodiments, the computer-implemented method further comprises: receiving an input natural language utterance from a user; converting, using the trained machine learning model, the input natural language utterance to an output logical form based on the input natural language utterance and database schema information; executing the output logical form on a database corresponding to the database schema information to obtain a result; and providing the result to the user.

Some embodiments include a system including one or more processors and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
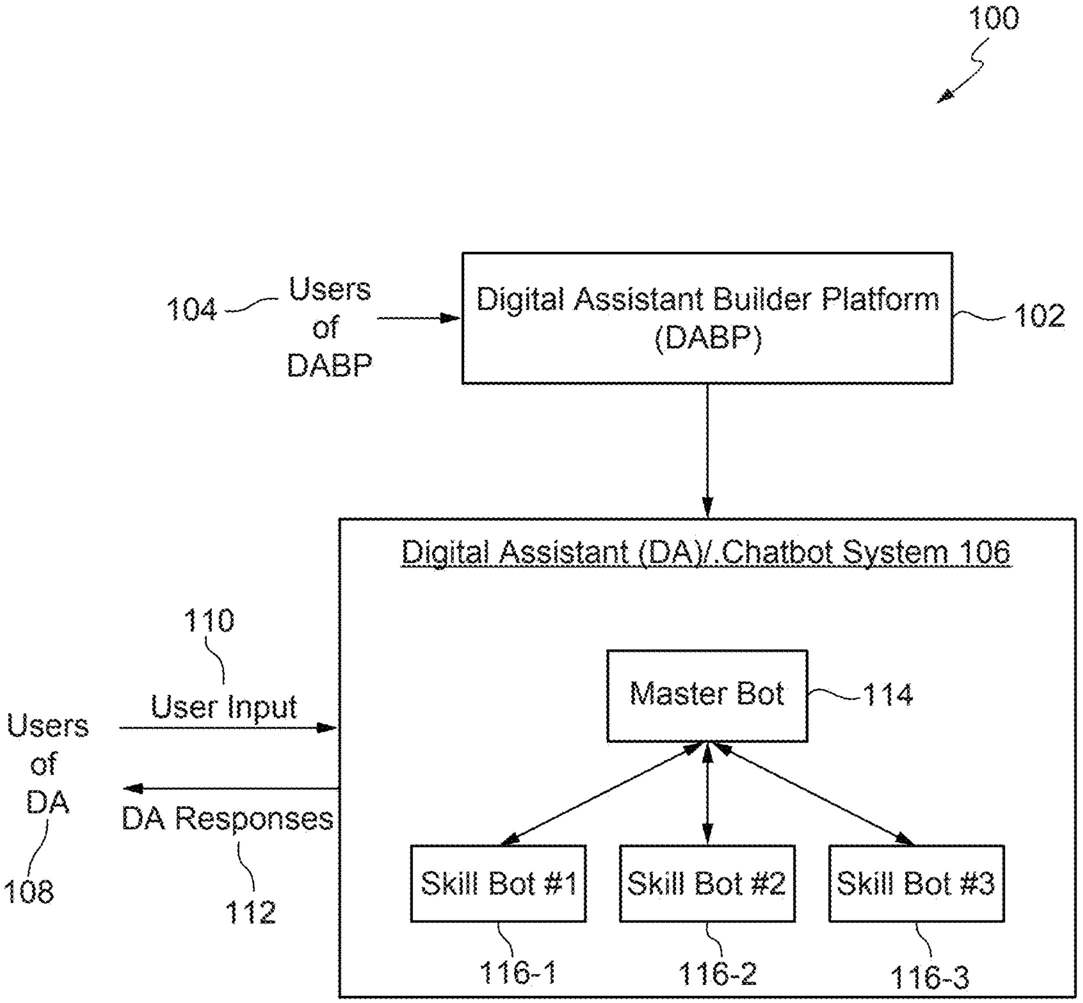
FIG. 1 is a simplified block diagram of a distributed environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word “exemplary” is used herein to mean “serving as an example, instance, or illustration.” Any embodiment or design described herein as "exemplary" is not necessarily to be construed as preferred or advantageous over other embodiments or designs.

INTRODUCTION

In recent years, the amount of data powering different industries and their systems has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., declarative database query languages) like Structured Query Language (SQL) and property graph query language (PGQL). Composing such queries can be used to derive insightful information from data stored in multiple tables. These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly get overwhelming for beginners and non-technical stakeholders. Efforts to bridge this communication gap have led to the development of a new type of processing called NL interfaces to databases systems (NLIDB), which facilitates search capabilities in databases using NL. Such NL search capabilities have become more popular over recent years, and, as such, companies are developing deep-learning approaches for other NLIDB-type capabilities such as natural language to logical form (NL2LF), NL to SQL (NL2SQL), and the like. In the present context, a logical form of a NL statement or utterance is a precisely specified semantic version of that statement or utterance in a formal system. Examples of logical forms include meaning representation language (MRL) and/or a machine-oriented language such as SQL or PGQL.

In the specific context of converting NL to a meaning representation language (MRL), a NL utterance (e.g., a user's question) is typically provided to a NL2LF model, which converts the NL utterance into a logical form, for example, a MRL having intermediate representations. The NL2LF model is a machine learning model trained to generate intermediate representations from NL utterances. The intermediate representations can then be translated to one or more desired query formats, such as SQL or PGQL using a translation process. In some instances, the intermediate representations are in a language called Oracle Meaning Representation Language (OMRL) [also known or described as Oracle Meaning Representation Query Language (OMRQL)], and a Conversation to Oracle Meaning Representation Language (C2OMRL) system performs the conversion of the natural language utterance to the logical form. In other instances, the NL utterance (e.g., a user's question) is provided to a NL2LF model, which directly converts the NL utterance into a final logical form, for example, one or more desired query formats, such as SQL or PGQL. In this instance, the NL2LF model is a machine learning model trained to generate final representations from NL utterances. Thereafter, the utterance in the desired query format may be executed on a backend system via a LF execution engine supporting the desired query format such as database to obtain data relevant to the query and formulate a response to the NL utterance (e.g., an answer to the user's question) for review by a user.

However, the NL2LF translation and application capability could make errors due to various reasons, including: the ambiguity in the input question and the system schema, the answer requires some domain specific knowledge that are not available to the current NL2LF model during the training time, background noise within the utterances, missing contextual information, and the like. Since the generated LF query is executed against a system (e.g., a database) using the LF execution engine before results are returned to the end users, there are two types of errors:

Execution Errors (see Table 1):

- The LF execution engine failed to execute the generated LF query and threw out an execution error message.

TABLE 1

| Error Group | Error Subgroup | Examples |
|---|---|---|
| Errors on Columns | no such column | no such column: T3.Name<br>no such column: Type |
| | ambiguous column name | ambiguous column name: Name<br>ambiguous column name: Model |
| Errors on Tables | no such table | no such table: Like<br>no such table: student_transcripts_tracking |
| Errors on Aggregate Functions | misuse of aggregate: | misuse of aggregate: sum( )<br>SELECT T1.first_name, T1.country_code, T1.player_id FROM players AS T1 JOIN rankings AS T2 ON T1.player_id = T2.player_id ORDER BY sum(T2.tours) DESC LIMIT 1<br>misuse of aggregate: count( )<br>SELECT T1.name, T2.date_of_treatment FROM Dogs AS T1 JOIN Treatments AS T2 ON T1.dog_id = T2.dog_id WHERE T1.breed_code = |

TABLE 1-continued

| Error Group | Error Subgroup | Examples |
|---|---|---|
| | | (SELECT breed_code FROM Breeds ORDER BY count(*) LIMIT 1) |
| | wrong number of arguments to function sum( ) | SELECT sum(*) FROM VOTES WHERE state = 'ny' OR state = 'ca' → sum on non-numeric columns |
| Errors with ORDER BY | near "*" | SELECT name FROM Highschooler ORDER BY * DESC LIMIT 1<br>SELECT * FROM Students ORDER BY * DESC |
| | 1st ORDER BY term does not match any column in . . . | SELECT T1.MakeId, T1.Make FROM car_names AS T1 JOIN cars_data AS T2 ON T1.MakeId = T2.Id WHERE T2.Cylinders < 4 EXCEPT SELECT T1.MakeId, T1.Make FROM car_names AS T1 JOIN cars_data AS T2 ON T1.MakeId = T2.Id GROUP BY T1.MakeId, T1.Make ORDER BY min(T2.Horsepower) ASC LIMIT 1 |
| Errors on Set Operation (Incompatible Sets) | SELECTs to the left and right of EXCEPT do not . . . | SELECT * FROM car_names AS T1 JOIN cars_data AS T2 ON T1.MakeId = T2.Id WHERE T2.Weight < 3500 EXCEPT SELECT T1.Model FROM car_names AS T1 JOIN car_makers AS T2 ON T1.MakeId = T2.Id WHERE T2.FullName = 'ford motor company' |
| | SELECTs to the left and right of INTERSECT do . . . | SELECT first_name FROM Professionals WHERE role_code = 'veterinarians' INTERSECT SELECT T1.first_name, T3.treatment_type_description FROM Professionals AS T1 JOIN Treatments AS T2 ON T1.professional_id = T2.professional_id JOIN Treatment_Types AS T3 ON T2.treatment_type_code = T3.treatment_type_code |
| Wrong Nested SELECT | only a single result allowed for a SELECT that . . . | SELECT T1.CountryId, T1.CountryName FROM countries AS T1 JOIN car_makers AS T2 ON T1.CountryId = T2.Country WHERE T2.Maker = 'fiat' OR (SELECT T1.CountryId, T1.CountryName FROM countries AS T1 JOIN car_makers AS T2 ON T1.CountryId = T2.Country GROUP BY T1.CountryId, T1.CountryName HAVING count(T2.Country) > 3) |
| Syntax Errors | near "2016" | SELECT winner_name FROM matches WHERE tourney_date = '2013 INTERSECT SELECT winner_name FROM matches WHERE tourney_date = '2016' |
| | near "wimbledon" | SELECT winner_name FROM matches WHERE tourney_name = 'wimbledon' AND tourney_date = '2013 INTERSECT SELECT winner_name FROM matches WHERE tourney_name = 'wimbledon' AND tourney_date = '2016' |

Semantic Errors:
- The LF execution engine successfully executed the generated LF query but the results are not expected by the users.
- For example:
  - The result set only contains a list of employee_ids from Australia rather than both employee_ids and employee_names.
- Users in this case can provide some feedbacks through various mechanisms such as a Chat UI so that the NL2LF model can revise its generated solution. There could be two types of user feedbacks:
  - Binary feedbacks: for example, thumb up versus thumb down.
  - Instruction feedbacks: "please revise the solution by adding employee name in the result".

The developed approach described herein addresses these challenges and others by considering execution error messages and user feedbacks as environmental error messages for the correction of execution and semantic type errors. To do so, in a training phase, data generation and augmentation techniques are utilized to enhance a pretrained NL2LF model (as described herein a pretrained Large Language Model (LLM)) with error correction capabilities. Firstly, an execution-based algorithm is used to collect execution and semantic error examples for fine-tuning the NL2LF instruction to the LLM. The algorithm utilizes the existing direct NL2LF model to generate LF queries from natural language input utterances. The generated and gold (ground truth) LF queries are then executed on a LF execution engine to extract execution and semantic errors which then are used to creates error correction prompt examples based on a template. Secondly, an LLM-based approach is utilized to generate natural language correction instructions for semantic error examples. This approach helps eliminate expensive labelling costs by humans. A combination of instruction-enhanced direct generation and execution-based criterion are used to filter out low-quality LLM instructions. Semantic error examples with extended correction instructions are added to the error correction dataset to fine-tune a new NL2LF model that can respond to both binary and instructional semantic feedback. Finally, a negative semantic error data augmentation method may be utilized to make the NL2LF model more robust to incorrect user feedback. Advantageously, it was demonstrated via experimentation that the error correction capability can correct nearly half of errors from the direct NL2LF generation, and the model is robust to wrong user feedbacks. The experiments also demonstrated the generalization of the error correction capability which can correct error examples from a newer NL2LF model.

In various embodiments, a computer-implemented method is disclosed that includes accessing a set of training examples, where each training example of the set of training examples comprises a natural language utterance, a gold logical form corresponding to the natural language utterance, and database schema information; generating a set of error correction training examples based on the set of training examples, wherein generating the set of error correction training examples comprises performing an iterative process for each training example of the set of training examples, and wherein the iterative process comprises: generating, by a text-to-logical form model, an inferred logical form based on the natural language utterance and the database schema information, executing the inferred logical form on a database corresponding to the database schema information, when executing the inferred logical form on the database fails, obtaining an execution error message corresponding to the failure, and recording the natural language utterance, the gold logical form, the database schema information, the inferred logical form, and the execution error message as an execution error example, and populating an error correction prompt template with the execution error example to generate an error correction training example; and training a machine learning model with at least the set of error correction training examples to generate a trained machine learning model.

In some instances, the iterative process further comprises when executing the inferred logical form on the database succeeds, obtaining an inferred result, executing the gold logical form on the database corresponding to the database schema information to obtain a gold result, and comparing the inferred result to the gold result; when the inferred result and the gold result are dissimilar, generating an error message corresponding to the dissimilarity, and recording the natural language utterance, the gold logical form, the database schema information, the inferred logical form, and the error message as a semantic error example; and populating the error correction prompt template with the semantic error example to generate an error correction training example.

As used herein, when an action is "based on" something, this means the action is based at least in part on at least a part of the something. As used herein, the terms "similarly," "substantially," "approximately" and "about" are defined as being largely but not necessarily wholly what is specified (and include wholly what is specified) as understood by one of ordinary skill in the art. In any disclosed embodiment, the term "similarly," "substantially," "approximately," or "about" may be substituted with "within [a percentage] of" what is specified, where the percentage includes 0.1, 1, 5, and 10 percent.

Bot Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bots to communicate with end users through a messaging application. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, the bot may be associated with a Uniform Resource Identifier (URI). The URI may identify the bot using a string of characters. The URI may be used as a webhook for one or more messaging application systems. The URI may include, for example, a Uniform Resource Locator (URL) or a Uniform Resource Name (URN). The bot may be designed to receive a message (e.g., a hypertext transfer protocol (HTTP) post call message) from a messaging application system. The HTTP post call message may be directed to the URI from the messaging application system. In some examples, the message may be different from a HTTP post call message. For example, the bot may receive a message from a Short Message Service (SMS). While discussion herein refers to communications that the bot receives as a message, it should be understood that the message may be an HTTP post call message, a SMS message, or any other type of communication between two systems.

End users interact with the bot through conversational interactions (sometimes referred to as a conversational user interface (UI)), just as end users interact with other people. In some cases, the conversational interactions may include the end user saying "Hello" to the bot and the bot responding with a "Hi" and asking the end user how it can help. End users also interact with the bot through other types of interactions, such as transactional interactions (e.g., with a banking bot that is at least trained to transfer money from one account to another), informational interactions (e.g., with a human resources bot that is at least trained check the remaining vacation hours the user has), and/or retail interactions (e.g., with a retail bot that is at least trained for discussing returning purchased goods or seeking technical support).

In some examples, the bot may intelligently handle end user interactions without intervention by an administrator or developer of the bot. For example, an end user may send one or more messages to the bot in order to achieve a desired goal. A message may include certain content, such as text, emojis, audio, image, video, or other method of conveying a message. In some examples, the bot may automatically convert content into a standardized form and generate a natural language response. The bot may also automatically prompt the end user for additional input parameters or request other additional information. In some examples, the bot may also initiate communication with the end user, rather than passively responding to end user utterances.

A conversation with a bot may follow a specific conversation flow including multiple states. The flow may define what would happen next based on an input. In some examples, a state machine that includes user defined states (e.g., end user intents) and actions to take in the states or from state to state may be used to implement the bot. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage the bot in a conversation to order pizza, where the user's intent would be represented through the utterance "order pizza." A user intent can be directed to a particular task that the user wishes the bot to perform on behalf of the user. Therefore, utterances reflecting the user's intent can be phrased as questions, commands, requests, and the like.

In the context of the configuration of the bot, the term "intent" is also used herein to refer to configuration information for mapping a user's utterance to a specific task/action or category of task/action that the bot can perform. In order to distinguish between the intent of an utterance (i.e., a user intent) and the intent of the bot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the bot to enable the intent classifier to subsequently determine whether an input utterance from a user matches the order pizza intent. Bot intents may be associated with one or more dialog flows for starting a conversation with the user and in a certain state. For example, the first message for the order pizza intent could be the question "What kind of pizza would you like?" In addition to associated utterances, bot intents may further comprise named entities that relate to the intent. For example, the order pizza intent could include variables or parameters used to perform the task of ordering pizza (e.g., topping 1, topping 2, pizza type, pizza size, pizza quantity, and the like). The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users 104 of DABP 102 to create and deploy digital assistants or chatbot systems. DABP 102 can be used to create one or more digital assistants (or DAs) or chatbot systems. For example, as shown in FIG. 1, users 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is a tool that helps users of the digital assistant accomplish various tasks through natural language conversations. A digital assistant can be implemented using software only (e.g., the digital assistant is a digital tool implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some examples, a user utterance 110 can be in audio input or speech form, such as when a user says or speaks something that is provided as input to digital assistant 106. The utterances are typically in a language spoken by the user. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some examples, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user of digital assistant 106 or are the results of conversion of input speech utterances to text form. This however is not intended to be limiting or restrictive in any manner.

For example, a user input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some examples, this processing involves a series or pipeline of processing steps including, for example, understanding the meaning of the input utterance, determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining, and reforming the utterance to develop a better understandable form (e.g., logical form) or structure for the utterance. Generating a response may include using NLG techniques.

The NLU processing performed by a digital assistant, such as digital assistant 106, can include various NLP related tasks such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain examples, the NLU processing is performed by digital assistant 106 itself. In some other examples, digital assistant 106 may use other resources to perform portions of the NLU processing. For example, the syntax and structure of an input utterance sentence may be identified by processing the sentence using a parser, a part-of-speech tagger, and/or a NER. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain examples, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, 116-3, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain examples, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, etc. This way the end user or consumer of the digital assistant need only know how to access the digital assistant through the common master bot interface and behind the scenes multiple skill bots are provided for handling the user request.

In certain examples, in a master bot/child bots' infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain examples, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain examples, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?," "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain examples, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain examples, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain examples, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain examples, the dialog flow definition for a skill bot contains three sections:

(a) a context sections (b) a default transitions section (c) states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section-Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition name a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill, they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
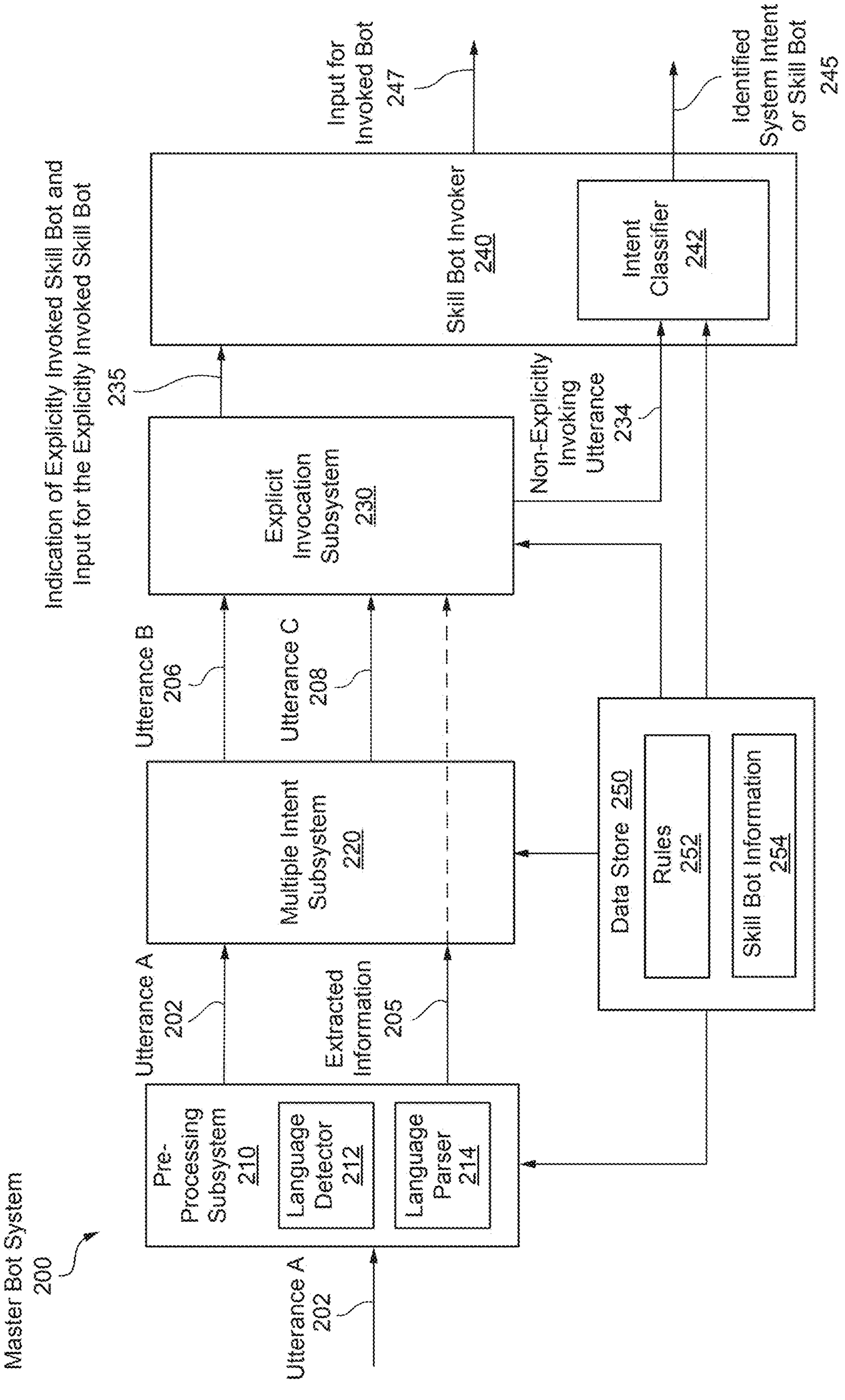
FIG. 2 is a simplified block diagram of a computing system implementing a master bot in accordance with various embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
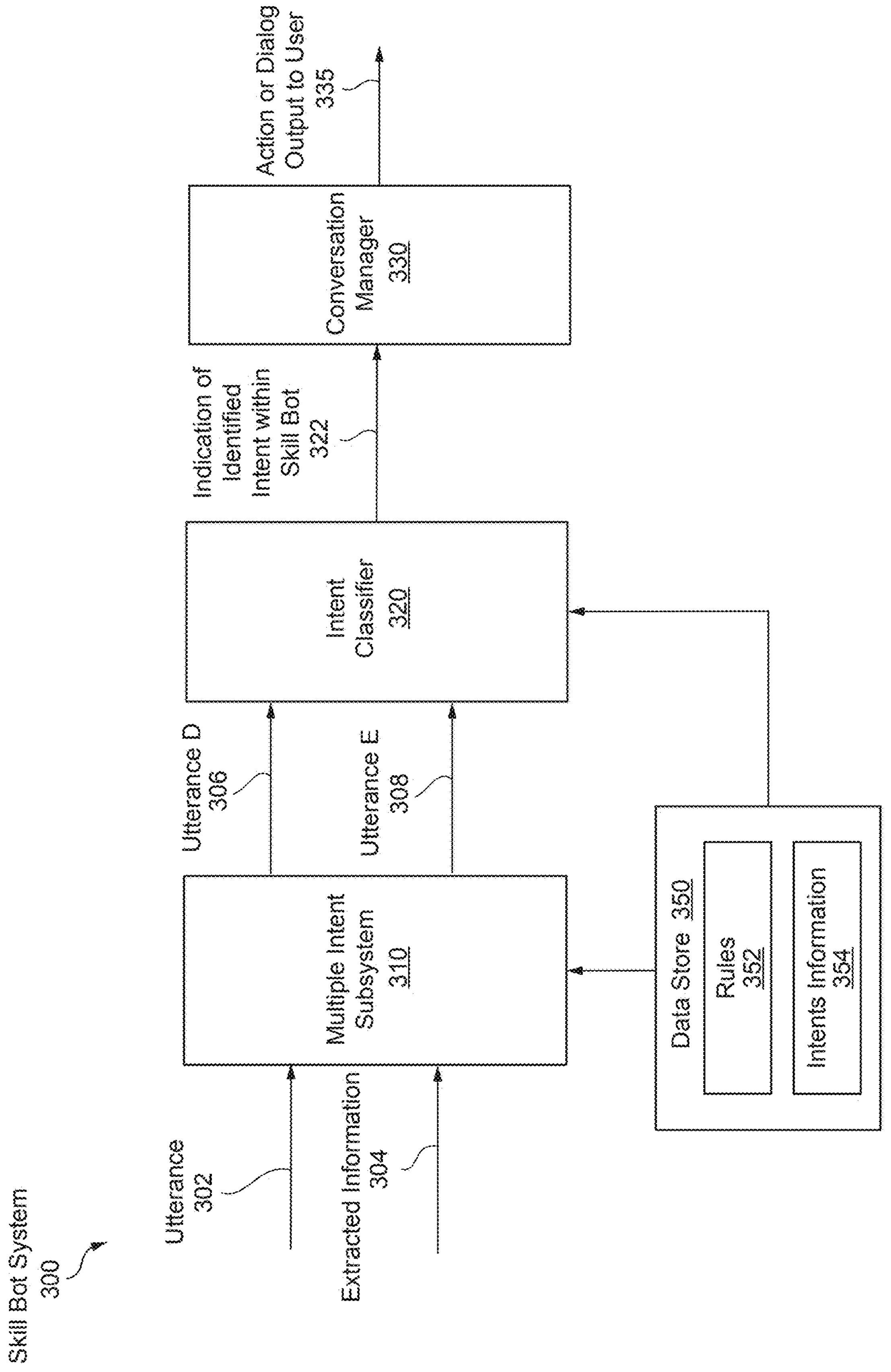
FIG. 3 is a simplified block diagram of a computing system implementing a skill bot in accordance with various embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot), or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent (e.g., "Place a pizza order using payment account X, then place a pizza order using payment account Y").

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot," then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Converting a Natural Language Utterance to a Logical Form

A NL2LF system is powered by a deep learning model (e.g., a NL2LF model such as a LLM) configured to convert a natural language (NL) utterance (e.g., a query posed by a user using a digital assistant or chatbot) into a logical form, for example, an intermediate database query language such as OMRL or a system query language format, such as SQL or PGQL. If an intermediate database query language format is used then the intermediate database query language can be used to generate a query in a specific system query language (e.g., SQL), which can then be executed for querying a system such as a database to obtain an answer to the user's utterance. If a system query language format is used, then the system query language can be directly executed for querying a system such as a database to obtain an answer to the user's utterance.

Figure 4:
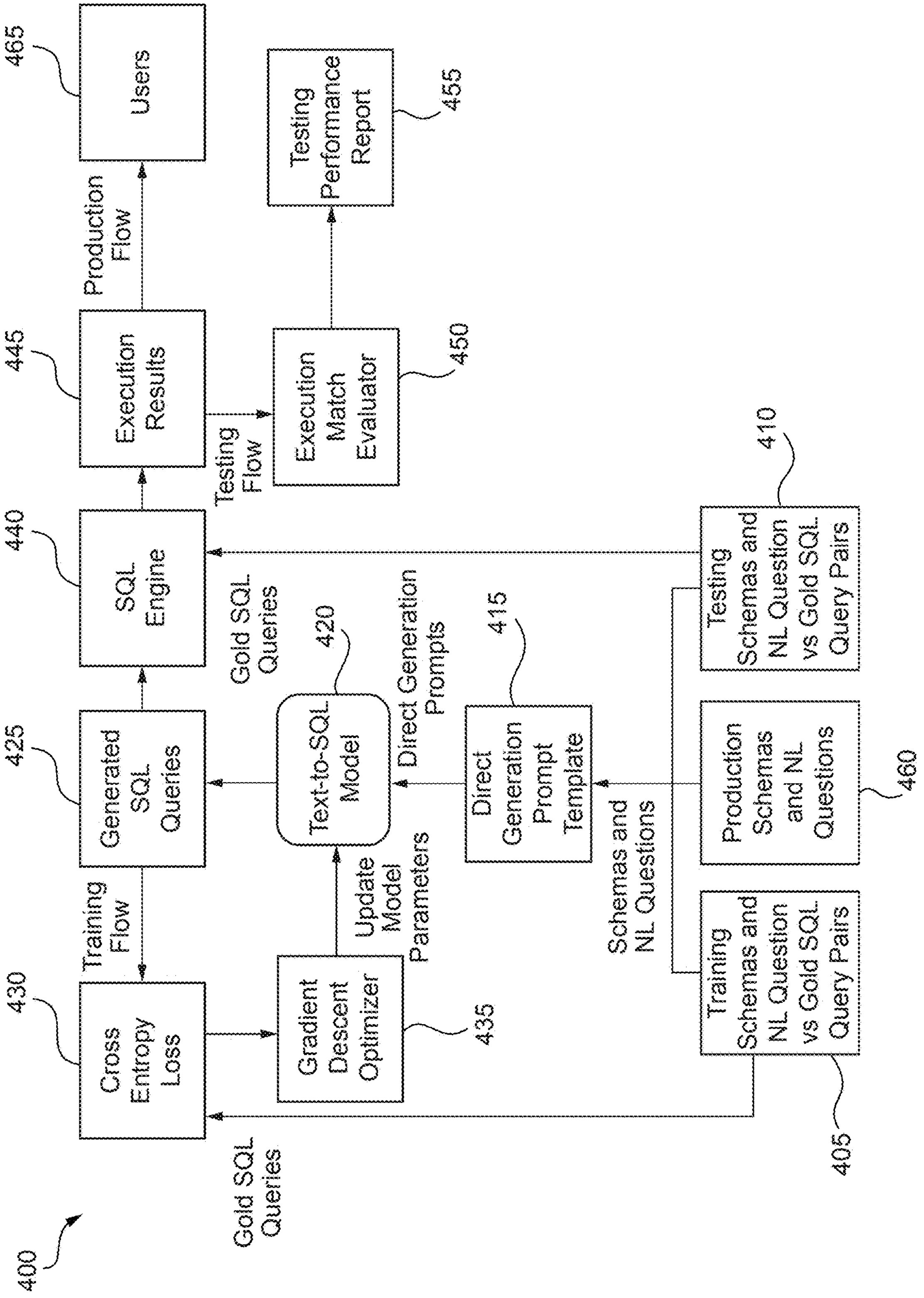
FIG. 4 is a simplified block diagram of an example system and flow for training, providing, and using machine learning models that can manage error corrections while transforming natural language utterances to logical forms in accordance with various embodiments.

FIG. 4 is a block diagram 400 illustrating an overview of training, testing, and inference flows for a NL2LF direct generation model (however it should be understood that similar steps could be implemented for a generation model that translates to an intermediate database query language which can be used to generate a query in a specific system query language). The main goal of the NL2LF model is to allow end users to interact with their systems, e.g., SQL databases through natural language rather than program specific language queries such as SQL queries. Using a NL2LF service, users such as business analysts can extract information from their systems without thorough knowledge of a specific programming language and system schemas.

The NL2LF direct generation model is an LLM, which is an advanced type of artificial intelligence model designed to understand and generate human language. These models are trained on vast amounts of text data and leverage deep learning techniques to perform a variety of natural language processing tasks, such as text generation, translation, summarization, and answering questions. In the below description, the LLM (Text-to-SQL model) is designed and trained to convert natural language queries into SQL queries. This involves understanding the semantics of the natural language input, mapping it to the corresponding database schema, and generating a syntactically and semantically correct SQL query that can retrieve the desired information from the database. However, it should be understood that similar techniques could be implemented for other system query languages such as PGQL and/or other intermediate logical forms such as MRL or OMRL.

The main input to the Text-to-SQL model is a natural language question.

For example:

"Get me the list of employees from Australia."

The main output from the Text-to-SQL model is a SQL query.

For example:

SELECT employee_id, employee_name FROM Employee WHERE country= "Australia".

Another important input to the Text-to-SQL model is the database schema that helps the model to identify relevant tables and columns in the SQL output construction.

For example:

```
CREATE TABLE Employee (
  employee_id TEXT(12) NOT NULL,
  employee_name TEXT(100) NOT NULL,
  birth_date DATE NOT NULL,
  hire_date DATE NOT NULL,
  country TEXT(100),
  ...
)
CREATE TABLE JobTitle (
  ...
)
...
```

Described herein is a pre-trained Text-to-SQL model developed based on instruction fine-tuning of LLMs to provide this Text-to-SQL direct generation capability, i.e. the mapping of (Database Schema, NL Question)→SQL Query. Below is the summary of how the Text-to-SQL direct generation capability is implemented via instruction fine-tuning.

Data to train a Text-to-SQL model includes multiple database schemas defined as SQL CREATE TABLE statements:

Table names

Column names and types

Primary and foreign keys

Other constraints

One Database Schema Example:

```
CREATE TABLE aircraft (
  aid NUMERIC(9, 0),
  name TEXT(30),
  distance NUMERIC(6, 0),
  PRIMARY KEY (aid)
)
CREATE TABLE employee (
  eid NUMERIC(9, 0),
  name TEXT(30),
  salary NUMERIC(10, 2),
  PRIMARY KEY (eid)
)
CREATE TABLE certificate (
  eid NUMERIC(9, 0),
  aid NUMERIC(9, 0),
  PRIMARY KEY (eid, aid),
  FOREIGN KEY(aid) REFERENCES aircraft (aid),
  FOREIGN KEY(eid) REFERENCES employee (eid)
```

-continued

```
)
CREATE TABLE flight (
  flno NUMERIC(4, 0),
  origin TEXT(20),
  destination TEXT(20),
  distance NUMERIC(6, 0),
  departure_date DATE,
  arrival_date DATE,
  price NUMERIC(7, 2),
  aid NUMERIC(9, 0),
  PRIMARY KEY (flno),
  FOREIGN KEY(aid) REFERENCES aircraft (aid)
)
```

Each database schema can be associated with multiple pairs of natural language questions and corresponding SQL queries.

Example of NL Question and corresponding SQL Query:

NL Question: "What is the name of the employee with salary greater than 100000 and with the most certificates to fly planes more than 5000?"

SQL Query: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count (*) DESC LIMIT 1"

Each question-query pair and its corresponding database schema are populated following a Text-to-SQL direct generation prompt template to create one direct generation prompt example:

Direction Text-to-SQL Generation Prompt Example:

Given an input Question, create a syntactically correct Oracle SQL query to run.

Pay attention to using only the column names that you can see in the schema description.

Be careful to not query for columns that do not exist. Also, pay attention to which column is in which table.

Please double check the SQL query you generate.

```
DO NOT use alias in the SELECT clauses.
Only use the tables listed below.
CREATE TABLE aircraft (
  aid NUMERIC(9, 0),
  name TEXT(30),
  distance NUMERIC(6, 0),
  PRIMARY KEY (aid)
)
CREATE TABLE employee (
  eid NUMERIC(9, 0),
  name TEXT(30),
  salary NUMERIC(10, 2),
  PRIMARY KEY (eid)
)
CREATE TABLE certificate (
  eid NUMERIC(9, 0),
  aid NUMERIC(9, 0),
  PRIMARY KEY (eid, aid),
  FOREIGN KEY(aid) REFERENCES aircraft (aid),
  FOREIGN KEY(eid) REFERENCES employee (eid)
)
CREATE TABLE flight (
  flno NUMERIC(4, 0),
  origin TEXT(20),
  destination TEXT(20),
  distance NUMERIC(6, 0),
  departure_date DATE,
  arrival_date DATE,
```

-continued

```
  price NUMERIC(7, 2),
  aid NUMERIC(9, 0),
  PRIMARY KEY (flno),
  FOREIGN KEY(aid) REFERENCES aircraft (aid)
)
```

Question: What is the name of the employee with salary greater than 100000 and with the most certificates to fly planes more than 5000?

SQL: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count (*) DESC LIMIT 1"

The prompt example can then be sent to the LLM model to generate the SQL query during training and testing phases. The gold (ground truth) SQL Query: "SELECT T1.name FROM employee AS T1 JOIN certificate AS T2 ON T1.eid=T2.eid JOIN aircraft AS T3 ON T2.aid=T3.aid WHERE T3.distance >5000 AND T1.salary >100000 GROUP BY T1.eid ORDER BY count (*) DESC LIMIT 1" is used to evaluate the generated SQL query using a loss function such as cross-entropy loss in training and a performance metric such as execution match in testing. For execution match, both gold and generated SQL queries are executed on the database using the SQL engine. Their result sets are compared to check if they are matched.

Training and Testing Flows

The training and testing flows start at blocks 405 and 410, respectively, where training and testing data is collected (e.g., acquired or accessed). The data collection can include exploring various data sources such as public datasets, private data collections, or real-time data streams, depending on a project's needs. In some instances, a data source is a public or online repository of information or examples pertinent to a general or target domain space. Many domains have publicly available datasets provided by governments, universities, or organizations. For example, many government and private entities offer datasets on healthcare, environmental data, and more through various portals. For proprietary needs, data might be available through partnerships or purchases from private companies that specialize in data aggregation. In other instances, a data source is a private repository of information or examples pertinent to a general or target domain space. For example, a data source can be a storage device that stores various schemas and natural language questions (including labels for corresponding gold SQL queries).

Preprocessing may be performed on the training and testing data, serving as a bridge between raw data acquisition and effective model training. The primary objective of preprocessing is to transform raw data into a format that is more suitable and efficient for analysis, ensuring that the data fed into machine learning algorithms is clean, consistent, and relevant. This step can be useful because raw data often comes with a variety of issues such as missing values, noise, irrelevant information, and inconsistencies that can significantly hinder the performance of a model. By standardizing and cleaning the data beforehand, preprocessing helps in enhancing the accuracy and efficiency of the subsequent analysis, making the data more representative of the underlying problem the model aims to solve. At block 415, the preprocessing includes populating the training and testing data into the direct generation prompt template (as described above) to create direct generation prompts from which the Text-to-SQL model generates SQL queries.

Once collected, generated, preprocessed, and/or labeled, the data may then be split into the training and testing datasets. The training and testing datasets may comprise the raw data and/or preprocessed data. The training and testing datasets are typically split into at least three subsets of data: training, validation, and testing. The training set is used to fit the model, where the machine learning model learns to make inferences based on the training data. The validation set, on the other hand, is utilized to tune hyperparameters and prevent overfitting by providing a sandbox for model selection. Finally, the test set serves as a new and unseen dataset for the model, used to simulate real-world application and evaluate the final model's performance. The process of splitting ensures that the model can perform well not just on the data it was trained on, but also on new, unseen data, thereby validating and testing its ability to generalize.

Various techniques can be employed to split the data effectively, with each method aiming to maintain a good representation of the overall dataset in each subset. A simple random split (e.g., a 70/20/10%, 80/10/10%, or 60/25/15%) is the most straightforward approach, where examples from the data are randomly assigned to each of the three sets. However, more sophisticated methods may be necessary to preserve the underlying distribution of data. For instance, stratified sampling may be used to ensure that each split reflects the overall distribution of a specific variable, particularly useful in cases where certain categories or outcomes are underrepresented. Another technique, k-fold cross-validation, involves rotating the validation set across different subsets of the data, maximizing the use of available data for training while still holding out portions for validation. These methods help in achieving more robust and reliable model evaluation and are useful in the development of predictive models that perform consistently across varied datasets.

At this stage, hyperparameters may also be acquired or set for the training and testing. The hyperparameters control the overall behavior of the models. Unlike model parameters that are learned automatically during training, hyperparameters are set before training begins and have a significant impact on the performance of the model. For example, in an LLM, hyperparameters include the learning rate, batch size, number of layers, number of attention heads, hidden layer size, dropout rate, weight decay, sequence length, and embedding dimension, among others. These settings can determine how quickly a model learns, its capacity to generalize from training data to unseen data, and its overall complexity. Correctly setting hyperparameters is important because inappropriate values can lead to models that underfit or overfit the data. Underfitting occurs when a model is too simple to learn the underlying pattern of the data, and overfitting happens when a model is too complex, learning the noise in the training data as if it were signal.

At block 420, the direct generation prompts (for the training and testing data) are input into the Text-to-SQL model via a training and testing subsystem for training and/or testing. The training and testing subsystem is comprised of a combination of specialized hardware and software to efficiently handle the computational demands required for training, validating, and testing a machine learning model. On the hardware side, high-performance GPUs (Graphics Processing Units) may be used for their ability to perform parallel processing, drastically speeding up the training of complex models, especially deep learning networks. CPUs (Central Processing Units), while generally slower for this task, may also be used for less complex model training or when parallel processing is less critical. TPUs (Tensor Processing Units), designed specifically for tensor calculations, provide another level of optimization for machine learning tasks. On the software side, a variety of frameworks and libraries are utilized, including TensorFlow, PyTorch, Keras, and scikit-learn. These tools offer comprehensive libraries and functions that facilitate the design, training, validation, and testing of a wide range of machine learning models across different computing platforms, whether local machines, cloud-based systems, or hybrid setups, enabling developers to focus more on model architecture and less on underlying computational details.

Training is the initial phase of developing machine learning models such as the Text-to-SQL model where the model learns to generate SQL queries (output at block 425) based on the data training data provided from the training datasets. During this phase, the model iteratively adjusts its internal model parameters to achieve a preset optimization condition. At blocks 430 and 435, the preset optimization condition can be achieved by minimizing the difference between the model output (e.g., generated SQL queries) and the ground truth labels (e.g., gold SQL queries) in the training data. In some instances, the preset optimization condition can be achieved when the preset fixed number of iterations or epochs (full passes through the training dataset) is reached. In some instances, the preset optimization condition is achieved when the performance on the validation dataset stops improving or starts to degrade. In some instances, the preset optimization condition is achieved when a convergence criterion is met, such as when the change in the model parameters falls below a certain threshold between iterations. This process, known as fitting, is fundamental because it directly influences the accuracy and effectiveness of the model.

In an exemplary training phase performed by the training and testing subsystem, the training subset of data is input into the machine learning algorithms to find a set of model parameters (e.g., weights, coefficients, trees, feature importance, and/or biases) that minimizes or maximizes an objective function (e.g., a loss function, a cost function, a contrastive loss function, a cross-entropy loss function, etc.). To train the machine learning algorithms to achieve accurate predictions, "errors" (e.g., a difference between a predicted label and the ground truth label) need to be minimized. In order to minimize the errors (blocks 430 and 435), the model parameters can be configured to be incrementally updated by minimizing the objective function over the training phase ("optimization"). Various different techniques (e.g., stochastic gradient descent) may be used to perform the optimization. For example, to train machine learning algorithms such as an LLM, optimization can be done using back propagation. The current error is typically propagated backwards to a previous layer, where it is used to modify the weights and bias in such a way that the error is minimized. The weights are modified using the optimization function. Other techniques such as random feedback, Direct Feedback Alignment (DFA), Indirect Feedback Alignment (IFA), Hebbian learning, and the like can also be used to update the model parameters in a manner as to minimize or maximize an objective function. This cycle is repeated until a desired state (e.g., a predetermined minimum value of the objective function) is reached.

Validating is another phase of training where the model is checked for deficiencies in performance and the hyperparameters are optimized based on validation data provided from the training datasets. The validation data helps to evaluate the model's performance, such as accuracy, precision, recall, or F1-score, to gauge how well the model is likely to perform in real-world scenarios. Hyperparameter optimization, on the other hand, involves adjusting the settings that govern the model's learning process (e.g., learning rate, number of layers, size of the layers in neural networks) to find the combination that yields the best performance on the validation data. One optimization technique is grid search, where a set of predefined hyperparameter values are systematically evaluated. The model is trained with each combination of these values, and the combination that produces the best performance on the validation set is chosen. Although thorough, grid search can be computationally expensive and impractical when the hyperparameter space is large. A more efficient alternative optimization technique is random search, which samples hyperparameter combinations from a defined distribution randomly. This approach can in some instances find a good combination of hyperparameter values faster than grid search. Advanced methods like Bayesian optimization, genetic algorithms, and gradient-based optimization may also be used to find optimal hyperparameters more effectively. These techniques model the hyperparameter space and use statistical methods to intelligently explore the space, seeking hyperparameters that yield improvements in model performance.

Once a machine learning model has been trained and validated, it undergoes a final evaluation using the test data provided from the training and testing datasets, which is a separate subset of the data that has not been used during the training or validation phases. This step is important as it provides an unbiased assessment of the model's performance in simulating production operation. The test dataset serves as new, unseen data for the model, mimicking how the model would perform when deployed in actual use. During testing, the model's generated SQL queries (output at block 425) can be compared against the true values (e.g., gold SQL queries) in the test dataset using various performance metrics such as accuracy, precision, recall, and mean squared error, depending on the nature of the problem. Additionally or alternatively, at blocks 440 and 445, the gold and generated SQL queries are executed on the corresponding database using a SQL engine (execution engine; see below in Production Flow section for detailed description) to obtain execution results. At block 450, the result sets from executing the gold and generated SQL queries are compared using an execution match evaluator to compute accuracy execution match metrics. This process helps to verify the generalizability of the model-its ability to perform well across different data samples and environments-highlighting potential issues like overfitting or underfitting and ensuring that the model is robust and reliable for practical applications. The Text-to-SQL model is fully validated and tested once the outputs have been reported and deemed acceptable by user defined acceptance parameters (block 455). Acceptance parameters may be determined using correlation techniques such as Bland-Altman method and the Spearman's rank correlation coefficients and calculating performance metrics such as the error, accuracy, precision, recall, receiver operating characteristic curve (ROC), etc.

Production Flow

The production flow starts at block 460 where production schemas and natural language utterances (real-world input data) are input into the Text-to-SQL model via a production subsystem for inference. The production subsystem is comprised of various components for deploying machine learning models such as the Text-to-SQL model in a production environment. In some instances, the Text-to-SQL resides as a component of a larger system or service (e.g., e.g., use with a digital assistant as described with respect to FIGS. 1-3). In some instances, the Text-to-SQL model and/or the inferences can be used by downstream applications to provide further information. For example, the inferences can be used to hold a conversation with a user as part of digital assistant or chatbot or can be used to provide data analysis to a user via an analytical service such as analytics cloud-based service. Deploying the Text-to-SQL model includes moving the model(s) from a development environment (e.g., the training and testing subsystem, where it has been trained, validated, and tested), into a production environment where it can make inferences on real-world data (e.g., input data). This step typically starts with the model being saved after training, including its parameters and configuration such as final architecture and hyperparameters. It is then converted, if necessary, into a format that is suitable for deployment, depending on the deployment environment. For instance, a model trained in a developmental computing environment such as Python might be converted into a Java-friendly format for integration into a larger enterprise application. Deployment can be conducted on various platforms, including on-premises servers or cloud environments like OCI, AWS, Azure, Google, etc. (see below discussion of various computer and cloud architectures with respect to FIGS. 6-10).

At block 415, the input data (i.e., production schemas and natural language utterances) are populated into the direct generation prompt template (as described above) to create direct generation prompts from which the Text-to-SQL model generates SQL queries. At block 420, the direct generation prompt is input into the Text-to-SQL model via the production subsystem for inference. The Text-to-SQL model then translates the natural language utterance into a SQL query. This translation process includes the Text-to-SQL model first parsing the natural language utterance to understand the user's intent. This involves identifying the key components of the request, such as the desired action (e.g., SELECT, UPDATE), the entities involved (e.g., tables, columns), and any conditions or filters. For example, if the user says, "Show me all the customers who signed up in the last month," the model identifies the action (retrieve data), the entities (customers), and the condition (signed up in the last month). The Text-to-SQL model then maps the identified entities and conditions to the corresponding elements in the schema (e.g., database schema). This step requires knowledge of the database structure, including table names, column names, and data types (which is included within the direct generation prompt template). Continuing with the example, the model needs to know that "customers" refers to a specific table, and "signed up" corresponds to a column (e.g., 'signup_date') in that table. Using the parsed intent and mapped schema elements, the Text-to-SQL model constructs a syntactically correct SQL query. This involves selecting the appropriate SQL keywords and structuring the query according to SQL syntax rules. For the example request, the LLM would generate the following SQL query:

```
```sql
SELECT * FROM customers WHERE signup_date >= DATE_SUB(CURDATE( ),
INTERVAL 1 MONTH);
```
```

The Text-to-SQL model may then validate the constructed SQL query to ensure it aligns with the user's intent and adheres to the database schema. This could involve checking for syntax errors, ensuring the correct use of SQL functions, and verifying the query against the schema. If necessary, the Text-to-SQL model refines the query to better match the user's request or correct any identified issues. This step might also involve asking the user for clarification if the original utterance was ambiguous. Once generated and optionally validated, the Text-to-SQL model outputs the SQL queries at block 425.

At blocks 440 and 445, the SQL queries are executed on the corresponding database using a SQL engine (execution engine) to obtain execution results. The execution engine executes the SQL queries on a database by following a multi-step process that involves parsing, optimizing, and executing the query. Initially, an SQL query is parsed to create an internal representation, typically an Abstract Syntax Tree (AST), which outlines the structure of the query. The engine then consults the database schema to validate the query, ensuring that all referenced tables, columns, and data types exist and are correctly used. Once validated, the query undergoes optimization, where the execution engine determines the most efficient way to access and manipulate the data, often through the use of query optimization techniques such as indexing, join algorithms, and query rewriting. This step aims to minimize resource usage and execution time. Finally, the optimized query is executed against the database. The execution engine processes the query plan, retrieves the required data from the storage engine, and applies any necessary transformations, such as filtering, sorting, or aggregating. The resulting data is then formatted and returned to the user or application that issued the query (block 465), completing the process of data retrieval.

To manage and maintain its performance, a deployed model such as the Text-to-SQL model may be continuously monitored to ensure it performs as expected over time. This involves tracking the model's inference accuracy, response times, and other operational metrics. Additionally, the model may require retraining or updates based on new data or changing conditions in the environment it is applied in. This can be useful because machine learning models can drift over time due to changes in the underlying data they are making predictions on-a phenomenon known as model drift. Therefore, maintaining a machine learning model in a production environment often involves setting up mechanisms for performance monitoring, regular evaluations against new test data, and potentially periodic updates and retraining of the model to ensure it remains effective and accurate in making predictions.

Text-to-SQL Error Correction

As discussed above, various embodiments are directed to adding to a current or pretrained NL2LF model (e.g., a Text-to-SQL model trained as described with respect to FIG. 4) an error correction capability for SQL queries incorrectly generated by the direct generation capability based on additional feedback from the SQL execution engine or the users. The error correction capability can be considered as a mapping of: (Database Schema, NL Question, Previous SQL Query, Error Message)→Revised SQL Query. In the below description, the LLM (Text-to-SQL model) is designed and trained to convert natural language queries into SQL queries with error correction capabilities. This involves understanding the semantics of the natural language input, mapping it to the corresponding database schema, understanding the error correction message and/or instructions, and generating a syntactically and semantically correct SQL query that can retrieve the desired information from the database without error. However, it should be understood that similar techniques could be implemented for other system query languages such as PGQL and/or other intermediate logical forms such as MRL or OMRL.

In order the implement the error correction capability, an instruction prompt fine-tuning approach is utilized to enhance a pretrained Text-to-SQL model. Firstly, an execution-based algorithm is used to collect execution and semantic error examples for fine-tuning the Text-to-SQL instruction to the LLM. The algorithm utilizes the existing direct Text-to-SQL model to generate LF queries from natural language input utterances. The generated and gold (ground truth) LF queries are then executed on a LF execution engine to extract execution and semantic errors which then are used to creates error correction prompt examples based on a template. Secondly, an LLM-based approach is utilized to generate natural language correction instructions for semantic error examples. This approach helps eliminate expensive labelling costs by humans. A combination of instruction-enhanced direct generation and execution-based criterion are used to filter out low-quality LLM instructions. Semantic error examples with extended correction instructions are added to the error correction dataset to fine-tune a new Text-to-SQL model that can respond to both binary and instructional semantic feedback. Finally, a negative semantic error data augmentation method may be utilized to make the Text-to-SQL model more robust to incorrect user feedback.

Instruction Finetuning Setting

Below is the instruction prompt template to generate training examples for the error correction capability.

Text-to-SQL Error Correction Prompt:

Given an input Question and the previously generated SQLite SQL query with its execution error message, create a new syntactically and semantically correct SQLite SQL query to run. Pay attention to using only the column names that you can see in the schema description. Be careful to not query for columns that do not exist. Also, pay attention to which column is in which table.

Please double check the SQLite SQL query you generate.

DO NOT use alias in the SELECT clauses.

Only use the tables listed below.

```
{DATABASE_SCHEMA}
Question: {NL_QUESTION}
SQLite SQL: {PREVIOUS_SQL_QUERY}
[Error Message]: {ERROR_MESSAGE}
New SQLite SQL:
```

For each data tuple (Database Schema, NL Question, Previous SQL Query, Error Message)→SQL Query, its corresponding elements are populated into the sections {DATABASE_SCHEMA}, {NL_QUESTION}, {PREVIOUS_SQL_QUERY}, and {ERROR_MESSAGE} of the above template to create one error correction training example. The algorithms to generate the tuples are described in detail in the below sections. The error correction training examples can then be combined with Text-to-SQL direct generation training examples (described with respect to FIG. 4). A current or pretrained Text-to-SQL model (e.g., a Text-to-SQL model trained as described with respect to FIG. 4) is then fine-tuned with this combined data set so that the updated model can have both direct generation and error correction capabilities. In some instances, fine-tuning can be performed from scratch with a pretrained Text-to-SQL model on this combined data set to acquire both capabilities at the same time rather than sequentially. No matter whether the model is fine-tuned from scratch or from a current or pretrained Text-to-SQL model, at each training step training examples are sampled from both sources with different sampling weights to ensure both capabilities are acquired, and the previous direct generation capability is not forgotten. Since the size of error correction data set is typically smaller than the size of direct generation data set, a sampling ratio such as 1:1 may be used to balance both prompt data sources. Moreover, if additional Text-to-SQL capabilities such as schema linking and explanation generation are desired, corresponding training prompt data can be created and the training examples can be randomly sampled across these data sets during the fine-tuning process.

Error Correction Prompt Data Generation with Execution

The goal of the first error correction algorithm is to generate error correction data tuples (Database Schema, NL Question, Previous SQL Query, Error Message) based on SQL query execution. The algorithm uses: (i) a data set of (Database Schema, NL Question)→SQL Query examples which are originally used to acquire a current direct Text-to-SQL model (referred to hereafter as direct Text-to-SQL data set), (ii) the current direct Text-to-SQL model (e.g., a Text-to-SQL model trained as described with respect to FIG. 4), and (iii) an SQL execution engine that can execute a SQL query on its corresponding database (e.g., the execution engine described with respect to FIG. 4).

To generate error correction data tuples from a direct Text-to-SQL data set, the first error correction algorithm starts by considering each example, which includes a database schema and a natural language utterance (Database Schema, NL Question)→SQL Query. For each example, use M (e.g., M=10) random seeds to generate SQL queries. The SQL generation of the direct model is stochastic, i.e. for a different random seed parameter, it could produce the same or some different SQLs. To have a large data size for error correction examples, errors are simulated from the direct SQL generation. Hence, in this example 10 different values for the random seed are used to get some variations in the generated SQLs. There is a likelihood to get 1 or 2 error examples from these 10 random variations. The correct ones are ignored, and the 1 or 2 error examples are processed. Consequently, for each random seed, the current direct Text-to-SQL model generates one or more SQL queries based on the database schema and natural language utterance, i.e. (Database Schema, NL Question)→ Generated SQL Query. Each generated SQL query is then executed on the database using the SQL engine. If the execution fails, the error message is recorded from the SQL engine and an execution error correction tuple is created, which includes the database schema, NL question, generated SQL query, and the error message (Database Schema, NL Question, Generated SQL Query, Error Message)→SQL Query. In order to determine a failure, the execution engine monitors, throughout the execution process, for any anomalies, interruptions, or errors. This includes keeping track of system responses, timeouts, and resource usage. If the execution encounters any issues such as syntax errors, runtime exceptions, missing resources, or system crashes, the engine detects these errors. An error message or code is typically generated by the system or database, which the execution engine captures.

If the command or query completes without errors and produces the expected result (e.g., correct data set, confirmation message), the execution is considered successful. Determination of an expected result may be determined by the SQL engine verifying the output against expected results or checking for an absence of error messages. If the execution succeeds, the SQL engine then executes the gold SQL query on the database. The result sets of both the generated SQL query and the gold SQL query are then compared. If the result sets are similar or the same, the first error correction algorithm moves on to the next step (i.e., if execution is ok and results matched, these examples are ignored. Only error cases are kept for use in constructing error correction examples). If they are not similar or the same, an error message is set as a statement of error, e.g., Set Error Message= "The SQL statement was executed against the database but the returned result set is not correct," and a semantic error correction tuple is created, which includes the database schema, NL question, generated SQL query, and the error message/statement (Database Schema, NL Question, Generated SQL Query, Error Message)→SQL Query.

To increase the diversity and size of the error correction examples, different checkpoints of the current direct Text-to-SQL model can be used in addition to or alternative to the random seeds. All execution and semantic error correction tuples are collected into a data set. Both types of error correction tuples generally have the same format. Finally, these tuples are populated by the first error correction algorithm into the Text-to-SQL Error Correction Prompt to create error correction training examples. The error correction training examples are then used to finetune the current direct Text-to-SQL model using similar techniques to those described with respect to FIG. 4 and above. In some instances, the error correction training examples are used to augment the Text-to-SQL direct generation training examples (described with respect to FIG. 4) and are then used in combination to finetune the current direct Text-to-SQL model using similar techniques to those described with respect to FIG. 4 and above.

Error Correction Instruction Generation with LLMs

One important observation with the first error correction algorithm is that all semantic error examples share the same error message, e.g., "The SQL statement was executed against the database, but the returned result set is not correct." This makes sense if users can only provide binary feedback such as thumb up or thumb down on the answer from the Text-to-SQL service. However, since users may be allowed through a Chat UI to enter some instructions to correct the previous SQL generation, there is a desire to extend the shared semantic error message with instructions specific for each error case. Consequently, for each semantic error example with the shared error message, one additional semantic error example may be created by a second error correction algorithm that creates natural language instructions to convert the error SQL query to the gold SQL query and these case-specific instructions are then appended to the shared semantic error message. Below is one example:

Question: Which States in Europe have at least 3 vehicle manufacturers?

Gold SQL Query: SELECT T1.CountryId, T1.CountryName FROM countries T1 JOIN continents T2 ON T1.Continent=T2.ContId JOIN car_makers T3 ON T1.CountryId=T3.Country WHERE T2.Continent= 'europe' GROUP BY T1.CountryId, T1.CountryName HAVING COUNT (T3.Country) >=3.

Semantic Error SQL Query: SELECT T1.CountryName, T1.CountryId FROM countries T1 JOIN continents T2 ON T1.Continent=T2.ContId JOIN car_makers T3 ON T1.CountryId=T3.Country WHERE T2.Continent= 'europe' GROUP BY T1.CountryName, T1. CountryId HAVING COUNT (T3.Country)>=3.

The shared semantic error message that will be replaced: The SQL statement was executed against the database, but the returned result set is not correct.

A semantic error message with specific instructions: The SQL statement was executed against the database, but the returned result set is not correct.

1. Change "T3.Country" in the COUNT function to just "T3" to count the number of car manufacturers in each country.
2. Remove "T1.CountryId" from the SELECT clause as it is not necessary for the answer.

These augmented examples with extended error messages will be added to the error examples during collection of the execution and semantic error correction tuples into a data set by the first error correction algorithm, as described above (which may ultimately be used to finetune the current direct Text-to-SQL model using similar techniques to those described with respect to FIG. 4 and above). Fine-tuning on these augmented examples allow the new model to respond to both binary and instruction semantic feedback. However, it is expensive to manually review each semantic error example and create correction instructions. Therefore, a pre-trained LLM (a pre-trained LLM separate from the direct Text-to-SQL model) such as Mixtral-8x7B-Instruct-v0.1 or Cohere Command R Plus is prompted by the second error correction algorithm to generate these instructions automatically.

In particular, for each semantic error example collected above by the first error correction algorithm, its Database Schema, NL Question, SQL Query, and Generated SQL Query fields are populated by the second error correction algorithm to the below Text-to-SQL Error Correction Instruction Generation Prompt template. To generate correction instructions for SQL queries from a direct Text-to-SQL model, the second error correction algorithm begins by considering M (e.g., M=10) random seeds. Different random values of the random seed are used to generate a number (e.g., 10) of different varied candidates of instructions. The second error correction algorithm will filter out the bad ones, and thus only keep instructions that are helpful. For each random seed, the pre-trained LLM generates one or more correction instructions based on the populated prompt and the current seed. These generated instructions are then appended to the thought section of the Text-to-SQL Direct Generation Prompt template. Next, the current direct Text-to-SQL model is tasked with generating K (K=5) random SQL queries using the populated Text-to-SQL Direct Generation Prompt. Each of these K generated SQL queries is executed, and their results are compared with the results from the gold SQL execution. If the proportion of matches between the generated queries and the gold queries is greater than or equal to a predetermined threshold, e.g., T (T=0.8), the instructions generated in the prior step are retained. These instructions are deemed effective as they assist the current direct Text-to-SQL model in arriving at the correct solution. If the proportion of matches between the generated queries and the gold queries is less than to the predetermined threshold, the instructions generated in the prior step are ignored.

With this random sampling approach, from each semantic error example, multiple examples with extended instruction messages can be generated, which can be used to finetune the current direct Text-to-SQL model using similar techniques to those described with respect to FIG. 4 (the NL variation of instructions could make the model more robust to user feedback). Below is an example of the Text-to-SQL Direct Generation Prompt.

Text-to-SQL Error Correction Instruction Generation Prompt:

First you are given a database schema, a question, and the correct SQLite SQL query. You are then given a wrong SQLite SQL query for the question. You need to give a list of instructions to transform the wrong SQLite SQL into the correct one.

Just give the instructions to correct the wrong SQLite SQL query, don't include the correct SQLite SQL query.

Keep the instructions concise.

Don't include the corrected SQL.

Only use the tables listed below.

```
{DATABASE_SCHEMA}
Question: {NL_QUESTION}
Correct SQLite SQL: {SQL_QUERY}
Wrong SQLite SQL: {GENERATED_SQL_QUERY}
```

Correction Instructions:

Text-to-SQL Direction Generation Prompt

Given an input Question, create a syntactically correct SQLite SQL query to run.

Pay attention to using only the column names that you can see in the schema description.

Be careful to not query for columns that do not exist. Also, pay attention to which column is in which table.

Please double check the SQLite SQL query you generate.

DO NOT use alias in the SELECT clauses.

Only use the tables listed below.

```
{DATABASE_SCHEMA}
Question: {NL_QUESTION}
Thought: {GENERATED_CORRECTION_INSTRUCTIONS}
SQLite SQL:
```

Illustrative Techniques for Error Correction

Figure 5:
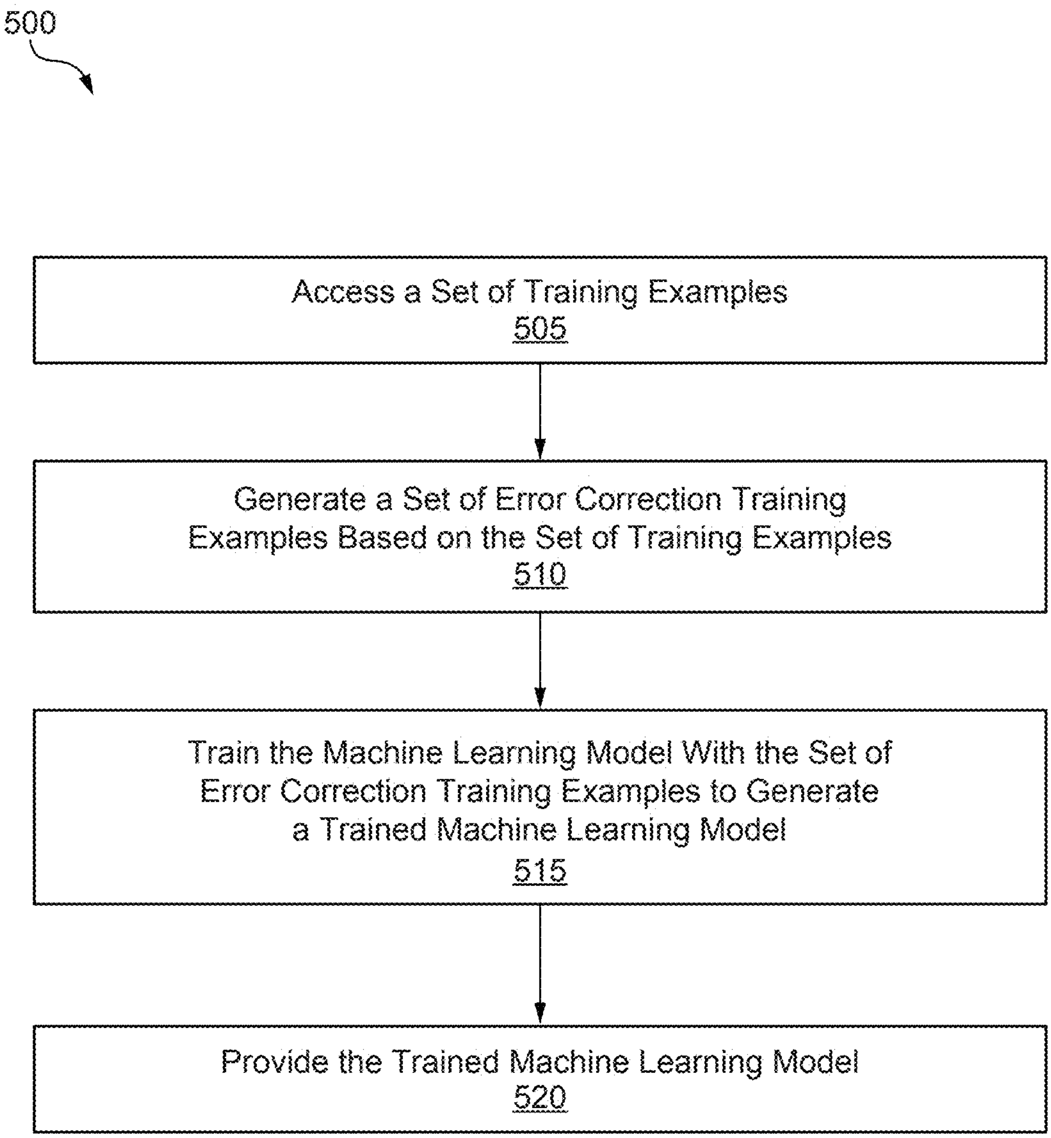
FIG. 5 is a process flow for training and providing a machine learning model for transforming a natural language utterance to a logical form with error correction capability in accordance with various embodiments.

FIG. 5 is a process flow 500 for training and providing a machine learning model for transforming a natural language utterance to a logical form with error correction capability. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-4, the processing depicted in FIG. 5 may be performed by a training, testing, and/or deployment system or subsystem, as described with respect to FIG. 4.

At block 505, a set of training examples is accessed. Each training example of the set of training examples comprises a natural language utterance, a gold logical form corresponding to the natural language utterance, and database schema information. In some instances, the training examples in the set of training examples are selected randomly from a batch of text-to-logical form examples. The set of training examples is a subset of the batch of text-to-logical form examples.

At block 510, a set of error correction training examples is generated based on the set of training examples. Generating the set of error correction training examples comprises performing an iterative process for each training example of the set of training examples. The iterative process comprises: generating, by a text-to-logical form model, an inferred logical form based on the natural language utterance and the database schema information, executing the inferred logical form on a database corresponding to the database schema information, when executing the inferred logical form on the database fails, obtaining an execution error message corresponding to the failure, and recording the natural language utterance, the gold logical form, the database schema information, the inferred logical form, and the execution error message as an execution error example, and populating an error correction prompt template with the execution error example to generate an error correction training example.

In some instances, the iterative process further comprises: when executing the inferred logical form on the database succeeds, obtaining an inferred result, executing the gold logical form on the database corresponding to the database schema information to obtain a gold result, and comparing the inferred result to the gold result; when the inferred result and the gold result are dissimilar, generating an error message corresponding to the dissimilarity, and recording the natural language utterance, the gold logical form, the database schema information, the inferred logical form, and the error message as a semantic error example; and populating the error correction prompt template with the semantic error example to generate an error correction training example.

In some instances, the iterative process further comprises: populating an error correction instruction prompt template with the semantic error example to generate an error correction instruction example; generating, by a large language model, error correction instructions based on the error correction instruction example; recording the natural language utterance, the gold logical form, the database schema information, the inferred logical form, the semantic error message, and the error correction instructions as an enhanced semantic error example; and populating the error correction prompt template with the enhanced semantic error example to generate an error correction training example.

In some instances, the iterative process further comprises: appending a text-to-logical form prompt template with the error correction instructions to generate an enhanced text-to-logical form prompt template; generating, by the text-to-logical form model, random logical forms based on the text-to-logical form prompt template; executing each of the random logical forms on a database corresponding to the database schema information to obtain a result for each of the random logical forms; comparing the result for each of the random logical forms to the gold result; and when a proportion of the results that are similar or the same to the gold result based on the comparing is greater than or equal to a predetermined threshold, the gold logical form, the database schema information, the inferred logical form, the semantic error message, and the error correction instructions are recorded as the enhanced semantic error example.

At block 515, the machine learning model is trained with the set of training examples and the set of error correction training examples to generate a trained machine learning model. In some instances, the machine learning model is a large language model pretrained for a task of converting an input natural language utterance to an output logical form.

At block 520, the trained machine learning model is provided. In some implementations, the trained machine learning model is provided (e.g., deployed) to a query execution system, where it can be used to execute processes for converting a natural language utterance to logical form (which can be used as part of a larger system such as a digital assistant or chatbot). The processes can include receiving an input natural language utterance from a user; converting, using the trained machine learning model, the input natural language utterance to an output logical form based on the input natural language utterance and database schema information; executing the output logical form on a database corresponding to the database schema information to obtain a result; and providing (e.g., transmitting via a UI) the result to the user.

Illustrative Systems

As noted above with respect to cloud computing implementations, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
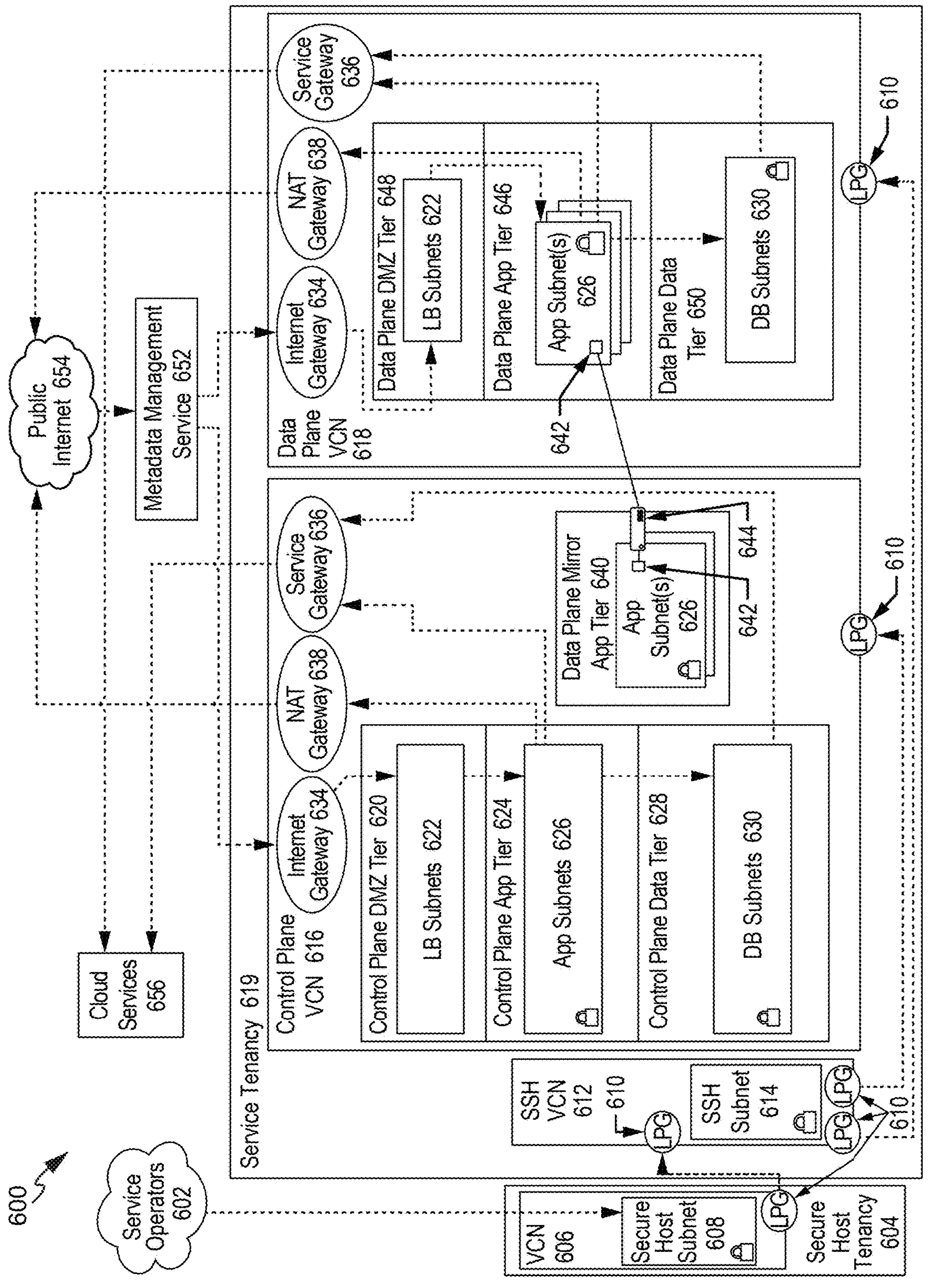
FIG. 6 is a block diagram illustrating one pattern for implementing a cloud infrastructure as a service system, in accordance with various embodiments.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively coupled to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Metadata that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
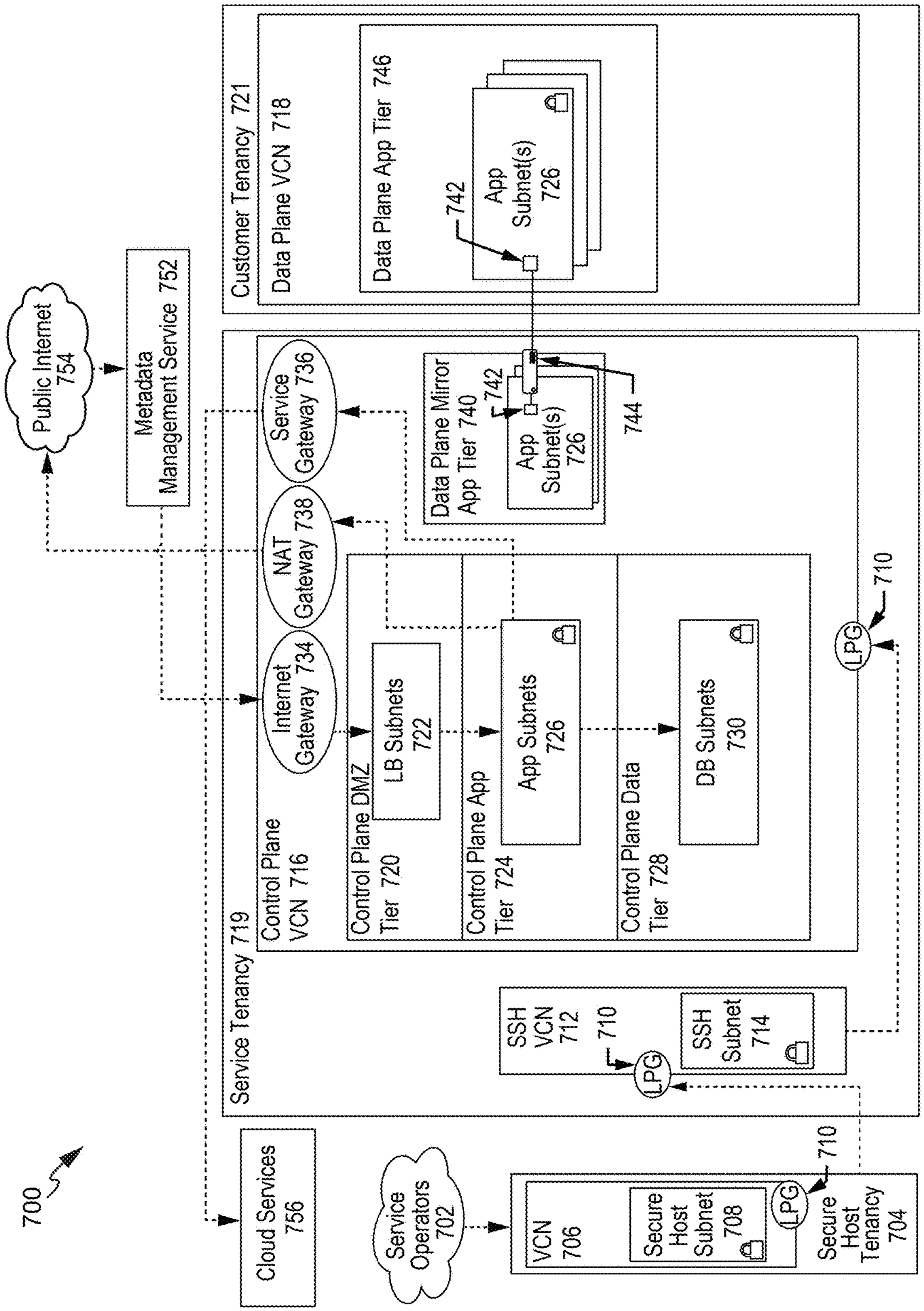
FIG. 7 is a block diagram illustrating another pattern for implementing a cloud infrastructure as a service system, in accordance with various embodiments.

FIG. 7 is a block diagram 700 illustrating another example pattern of an laaS architecture, according to at least one embodiment. Service operators 702 (e.g., service operators 602 of FIG. 6) can be communicatively coupled to a secure host tenancy 704 (e.g., the secure host tenancy 604 of FIG. 6) that can include a virtual cloud network (VCN) 706 (e.g., the VCN 606 of FIG. 6) and a secure host subnet 708 (e.g., the secure host subnet 608 of FIG. 6). The VCN 706 can include a local peering gateway (LPG) 710 (e.g., the LPG 610 of FIG. 6) that can be communicatively coupled to a secure shell (SSH) VCN 712 (e.g., the SSH VCN 612 of FIG. 6) via an LPG 610 contained in the SSH VCN 712. The SSH VCN 712 can include an SSH subnet 714 (e.g., the SSH subnet 614 of FIG. 6), and the SSH VCN 712 can be communicatively coupled to a control plane VCN 716 (e.g., the control plane VCN 616 of FIG. 6) via an LPG 710 contained in the control plane VCN 716. The control plane VCN 716 can be contained in a service tenancy 719 (e.g., the service tenancy 619 of FIG. 6), and the data plane VCN 718 (e.g., the data plane VCN 618 of FIG. 6) can be contained in a customer tenancy 721 that may be owned or operated by users, or customers, of the system.

The control plane VCN 716 can include a control plane DMZ tier 720 (e.g., the control plane DMZ tier 620 of FIG. 6) that can include LB subnet(s) 722 (e.g., LB subnet(s) 622 of FIG. 6), a control plane app tier 724 (e.g., the control plane app tier 624 of FIG. 6) that can include app subnet(s) 726 (e.g., app subnet(s) 626 of FIG. 6), a control plane data tier 728 (e.g., the control plane data tier 628 of FIG. 6) that can include database (DB) subnet(s) 730 (e.g., similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g., the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g., the service gateway 636 of FIG. 6) and a network address translation (NAT) gateway 738 (e.g., the NAT gateway 638 of FIG. 6). The control plane VCN 716 can include the service gateway 736 and the NAT gateway 738.

The control plane VCN 716 can include a data plane mirror app tier 740 (e.g., the data plane mirror app tier 640 of FIG. 6) that can include app subnet(s) 726. The app subnet(s) 726 contained in the data plane mirror app tier 740 can include a virtual network interface controller (VNIC) 742 (e.g., the VNIC of 642) that can execute a compute instance 744 (e.g., similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g., the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g., the metadata management service 652 of FIG. 6) that can be communicatively coupled to public Internet 754 (e.g., public Internet 654 of FIG. 6). Public Internet 754 can be communicatively coupled to the NAT gateway 738 contained in the control plane VCN 716. The service gateway 736 contained in the control plane VCN 716 can be communicatively coupled to cloud services 756 (e.g., cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
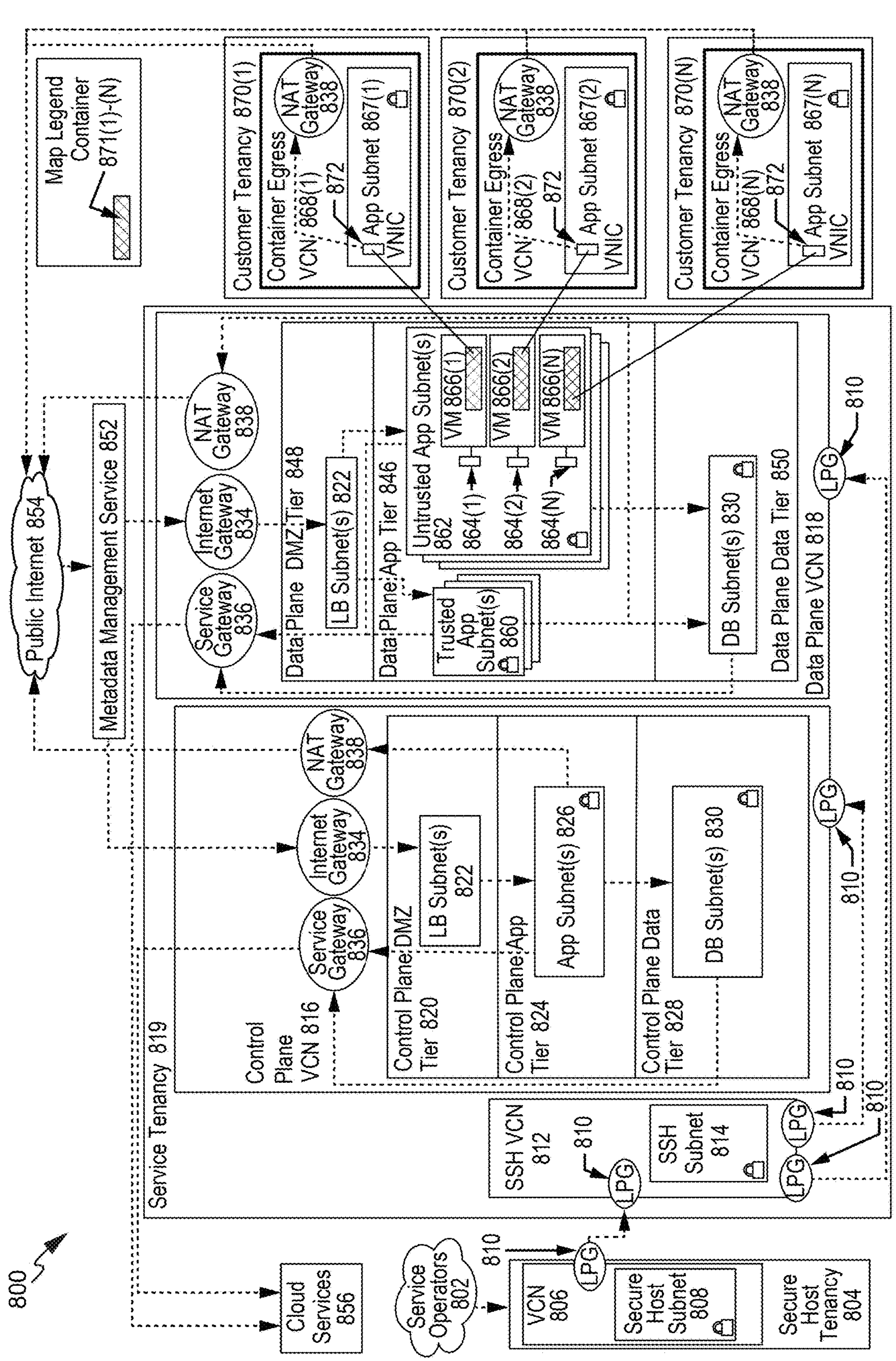
FIG. 8 is a block diagram illustrating another pattern for implementing a cloud infrastructure as a service system, in accordance with various embodiments.

FIG. 8 is a block diagram 800 illustrating another example pattern of an IaaS architecture, according to at least one embodiment. Service operators 802 (e.g., service operators 602 of FIG. 6) can be communicatively coupled to a secure host tenancy 804 (e.g., the secure host tenancy 604 of FIG. 6) that can include a virtual cloud network (VCN) 806 (e.g., the VCN 606 of FIG. 6) and a secure host subnet 808 (e.g., the secure host subnet 608 of FIG. 6). The VCN 806 can include an LPG 810 (e.g., the LPG 610 of FIG. 6) that can be communicatively coupled to an SSH VCN 812 (e.g., the SSH VCN 612 of FIG. 6) via an LPG 810 contained in the SSH VCN 812. The SSH VCN 812 can include an SSH subnet 814 (e.g., the SSH subnet 614 of FIG. 6), and the SSH VCN 812 can be communicatively coupled to a control plane VCN 816 (e.g., the control plane VCN 616 of FIG. 6) via an LPG 810 contained in the control plane VCN 816 and to a data plane VCN 818 (e.g., the data plane 618 of FIG. 6) via an LPG 810 contained in the data plane VCN 818. The control plane VCN 816 and the data plane VCN 818 can be contained in a service tenancy 819 (e.g., the service tenancy 619 of FIG. 6).

The control plane VCN 816 can include a control plane DMZ tier 820 (e.g., the control plane DMZ tier 620 of FIG. 6) that can include load balancer (LB) subnet(s) 822 (e.g., LB subnet(s) 622 of FIG. 6), a control plane app tier 824 (e.g., the control plane app tier 624 of FIG. 6) that can include app subnet(s) 826 (e.g., similar to app subnet(s) 626 of FIG. 6), a control plane data tier 828 (e.g., the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g., the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 6) and a network address translation (NAT) gateway 838 (e.g., the NAT gateway 638 of FIG. 6). The control plane VCN 816 can include the service gateway 836 and the NAT gateway 838.

The data plane VCN 818 can include a data plane app tier 846 (e.g., the data plane app tier 646 of FIG. 6), a data plane DMZ tier 848 (e.g., the data plane DMZ tier 648 of FIG. 6), and a data plane data tier 850 (e.g., the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864 (1)-(N) that can be communicatively coupled to tenant virtual machines (VMs) 866 (1)-(N). Each tenant VM 866 (1)-(N) can be communicatively coupled to a respective app subnet 867 (1)-(N) that can be contained in respective container egress VCNs 868 (1)-(N) that can be contained in respective customer tenancies 870 (1)-(N). Respective secondary VNICs 872 (1)-(N) can facilitate communication between the untrusted app subnet(s) 862 contained in the data plane VCN 818 and the app subnet contained in the container egress VCNs 868 (1)-(N). Each container egress VCNs 868 (1)-(N) can include a NAT gateway 838 that can be communicatively coupled to public Internet 854 (e.g., public Internet 654 of FIG. 6).

The Internet gateway 834 contained in the control plane VCN 816 and contained in the data plane VCN 818 can be communicatively coupled to a metadata management service 852 (e.g., the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 846. Code to run the function may be executed in the VMs 866 (1)-(N), and the code may not be configured to run anywhere else on the data plane VCN 818. Each VM 866 (1)-(N) may be connected to one customer tenancy 870. Respective containers 871 (1)-(N) contained in the VMs 866 (1)-(N) may be configured to run the code. In this case, there can be a dual isolation (e.g., the containers 871 (1)-(N) running code, where the containers 871 (1)-(N) may be contained in at least the VM 866 (1)-(N) that are contained in the untrusted app subnet(s) 862), which may help prevent incorrect or otherwise undesirable code from damaging the network of the IaaS provider or from damaging a network of a different customer. The containers 871 (1)-(N) may be communicatively coupled to the customer tenancy 870 and may be configured to transmit or receive data from the customer tenancy 870. The containers 871 (1)-(N) may not be configured to transmit or receive data from any other entity in the data plane VCN 818. Upon completion of running the code, the IaaS provider may kill or otherwise dispose of the containers 871 (1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871 (1)-(N) that can be contained in the VM 866 (1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
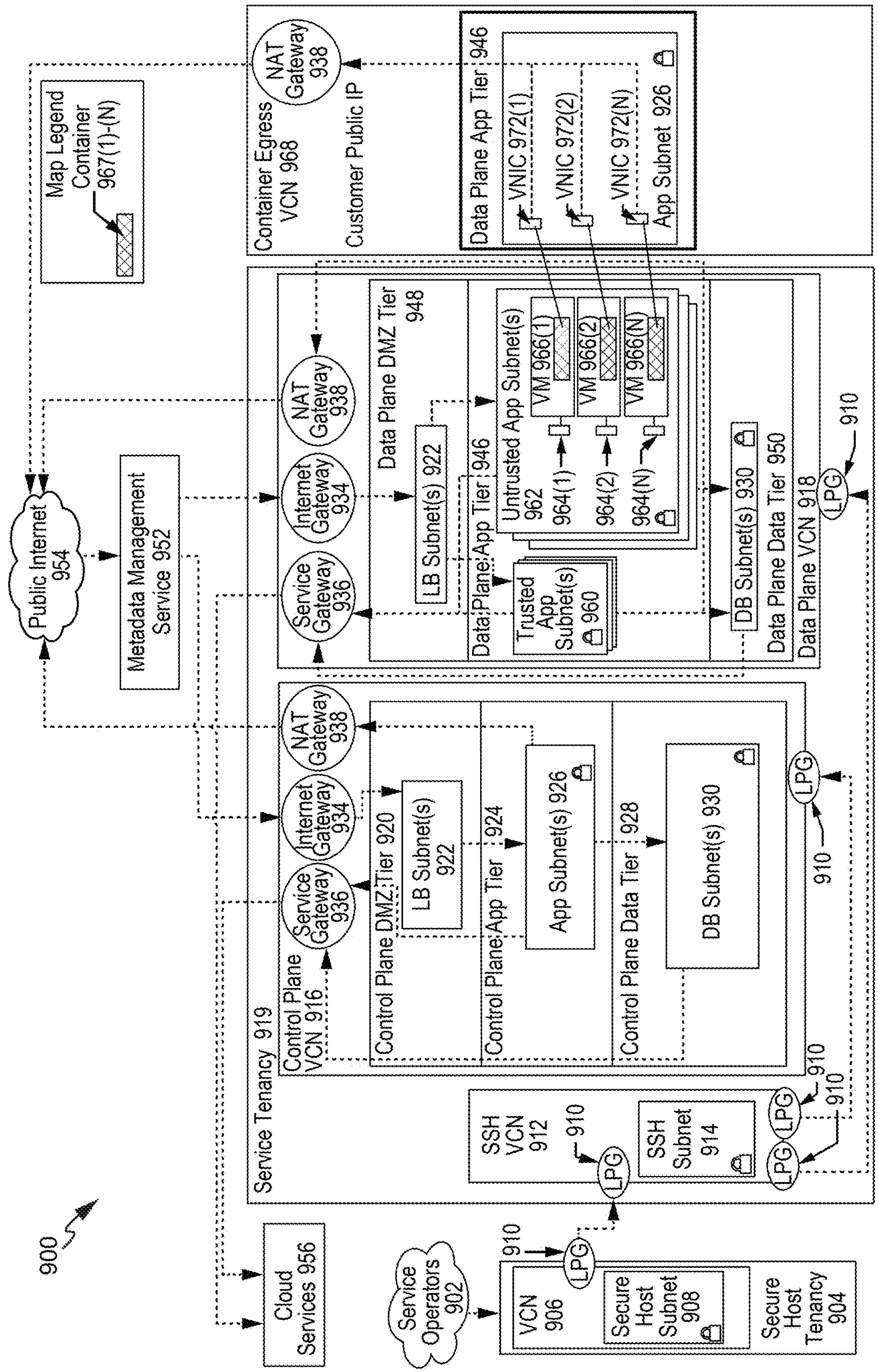
FIG. 9 is a block diagram illustrating another pattern for implementing a cloud infrastructure as a service system, in accordance with various embodiments.

FIG. 9 is a block diagram 900 illustrating another example pattern of an IaaS architecture, according to at least one embodiment. Service operators 902 (e.g., service operators 602 of FIG. 6) can be communicatively coupled to a secure host tenancy 904 (e.g., the secure host tenancy 604 of FIG. 6) that can include a virtual cloud network (VCN) 906 (e.g., the VCN 606 of FIG. 6) and a secure host subnet 908 (e.g., the secure host subnet 608 of FIG. 6). The VCN 906 can include an LPG 910 (e.g., the LPG 610 of FIG. 6) that can be communicatively coupled to an SSH VCN 912 (e.g., the SSH VCN 612 of FIG. 6) via an LPG 910 contained in the SSH VCN 912. The SSH VCN 912 can include an SSH subnet 914 (e.g., the SSH subnet 614 of FIG. 6), and the SSH VCN 912 can be communicatively coupled to a control plane VCN 916 (e.g., the control plane VCN 616 of FIG. 6) via an LPG 910 contained in the control plane VCN 916 and to a data plane VCN 918 (e.g., the data plane 618 of FIG. 6) via an LPG 910 contained in the data plane VCN 918. The control plane VCN 916 and the data plane VCN 918 can be contained in a service tenancy 919 (e.g., the service tenancy 619 of FIG. 6).

The control plane VCN 916 can include a control plane DMZ tier 920 (e.g., the control plane DMZ tier 620 of FIG. 6) that can include LB subnet(s) 922 (e.g., LB subnet(s) 622 of FIG. 6), a control plane app tier 924 (e.g., the control plane app tier 624 of FIG. 6) that can include app subnet(s)

926 (e.g., app subnet(s) 626 of FIG. 6), a control plane data tier 928 (e.g., the control plane data tier 628 of FIG. 6) that can include DB subnet(s) 930 (e.g., DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g., the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 6) and a network address translation (NAT) gateway 938 (e.g., the NAT gateway 638 of FIG. 6). The control plane VCN 916 can include the service gateway 936 and the NAT gateway 938.

The data plane VCN 918 can include a data plane app tier 946 (e.g., the data plane app tier 646 of FIG. 6), a data plane DMZ tier 948 (e.g., the data plane DMZ tier 648 of FIG. 6), and a data plane data tier 950 (e.g., the data plane data tier 650 of FIG. 6). The data plane DMZ tier 948 can include LB subnet(s) 922 that can be communicatively coupled to trusted app subnet(s) 960 (e.g., trusted app subnet(s) 860 of FIG. 8) and untrusted app subnet(s) 962 (e.g., untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964 (1)-(N) that can be communicatively coupled to tenant virtual machines (VMs) 966 (1)-(N) residing within the untrusted app subnet(s) 962. Each tenant VM 966 (1)-(N) can run code in a respective container 967 (1)-(N), and be communicatively coupled to an app subnet 926 that can be contained in a data plane app tier 946 that can be contained in a container egress VCN 968. Respective secondary VNICs 972 (1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g., public Internet 654 of FIG. 6).

The Internet gateway 934 contained in the control plane VCN 916 and contained in the data plane VCN 918 can be communicatively coupled to a metadata management service 952 (e.g., the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively coupled to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967 (1)-(N) that are contained in the VMs 966 (1)-(N) for each customer can be accessed in real-time by the customer. The containers 967 (1)-(N) may be configured to make calls to respective secondary VNICs 972 (1)-(N) contained in app subnet(s) 926 of the data plane app tier 946 that can be contained in the container egress VCN 968. The secondary VNICs 972 (1)-(N) can transmit the calls to the NAT gateway 938 that may transmit the calls to public Internet 954. In this example, the containers 967 (1)-(N) that can be accessed in real-time by the customer can be isolated from the control plane VCN 916 and can be isolated from other entities contained in the data plane VCN 918. The containers 967 (1)-(N) may also be isolated from resources from other customers.

In other examples, the customer can use the containers 967 (1)-(N) to call cloud services 956. In this example, the customer may run code in the containers 967 (1)-(N) that requests a service from cloud services 956. The containers 967 (1)-(N) can transmit this request to the secondary VNICs 972 (1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
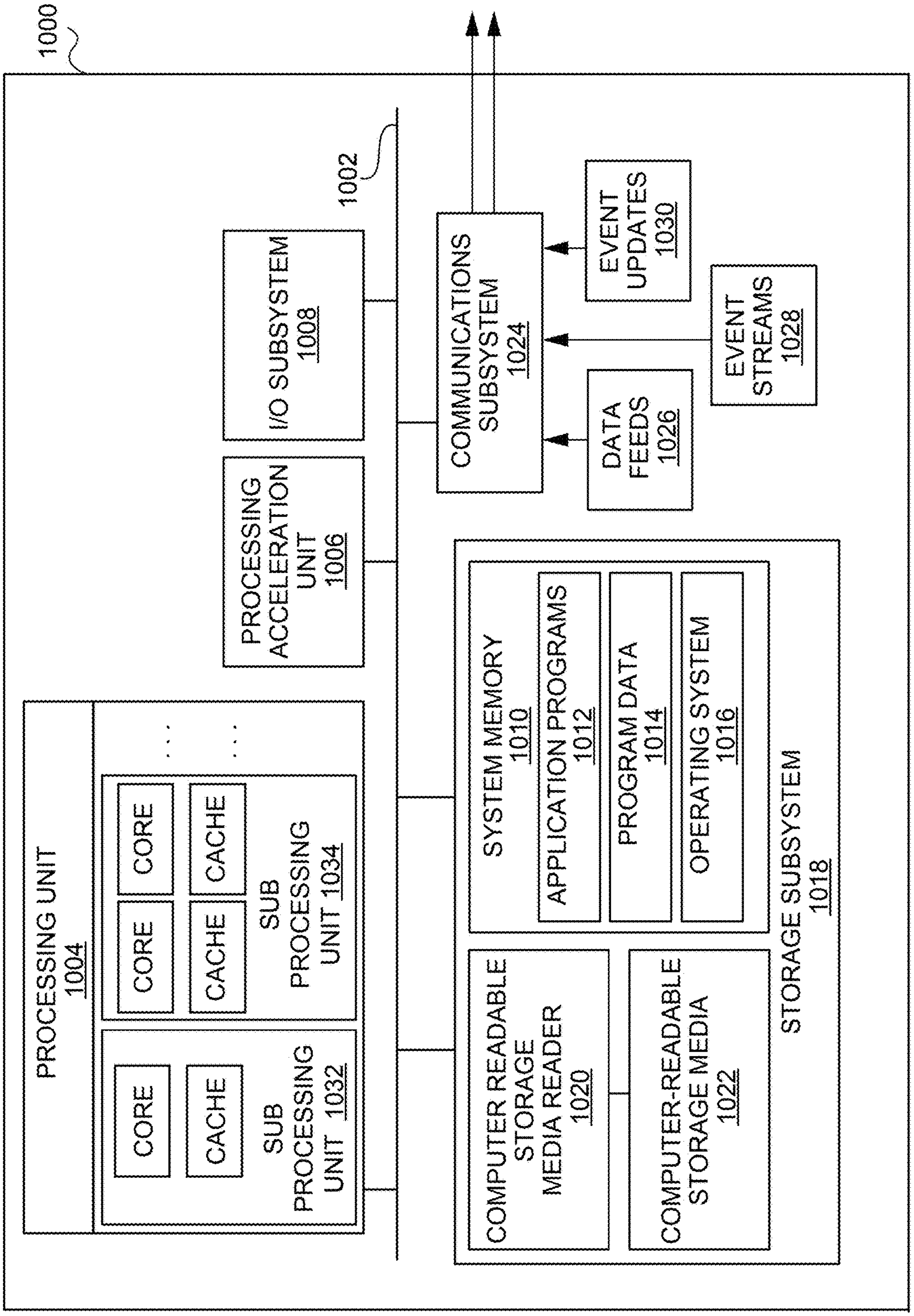
FIG. 10 is a block diagram illustrating an example computer system, in accordance with various embodiments.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., ‘blinking’ while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term “output device” is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1004 provide the functionality described above. Storage subsystem 1018 may also provide a repository for storing data used in accordance with the present disclosure.

As depicted in the example in FIG. 10, storage subsystem 1018 can include various components including a system memory 1010, computer-readable storage media 1022, and a computer readable storage media reader 1020. System memory 1010 may store program instructions that are loadable and executable by processing unit 1004. System memory 1010 may also store data that is used during the execution of the instructions and/or data that is generated during the execution of the program instructions. Various different kinds of programs may be loaded into system memory 1010 including but not limited to client applications, Web browsers, mid-tier applications, relational database management systems (RDBMS), virtual machines, containers, etc.

System memory 1010 may also store an operating system 1016. Examples of operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1000 executes one or more virtual machines, the virtual machines along with their guest operating systems (GOSs) may be loaded into system memory 1010 and executed by one or more processors or cores of processing unit 1004.

System memory 1010 can come in different configurations depending upon the type of computer system 1000. For example, system memory 1010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1010 may include a basic input/output system (BIOS) containing basic routines that help to transfer information between elements within computer system 1000, such as during start-up.

Computer-readable storage media 1022 may represent remote, local, fixed, and/or removable storage devices plus storage media for temporarily and/or more permanently containing, storing, computer-readable information for use by computer system 1000 including instructions executable by processing unit 1004 of computer system 1000.

Computer-readable storage media 1022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Machine-readable instructions executable by one or more processors or cores of processing unit 1004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

accessing a set of training examples, wherein each training example of the set of training examples comprises a natural language utterance, a gold logical form corresponding to the natural language utterance, and database schema information;

generating a set of error correction training examples based on the set of training examples, wherein generating the set of error correction training examples comprises performing an iterative process for each training example of the set of training examples, and wherein the iterative process comprises:

generating, by a text-to-logical form model comprising a deep neural network, an inferred logical form based on the natural language utterance and the database schema information, executing the inferred logical form on a database corresponding to the database schema information, when executing the inferred logical form on the database fails, obtaining an execution error message corresponding to the failure, recording the natural language utterance, the gold logical form, the database schema information, the inferred logical form, and the execution error message as an execution error example, and populating an error correction prompt template with the execution error example to generate an error correction training example;

when executing the inferred logical form on the database succeeds, obtaining an inferred result and performing the following:

executing the gold logical form on the database corresponding to the database schema information to obtain a gold result, comparing the inferred result to the gold result to determine whether the inferred result and the gold result are dissimilar, in response to the inferred result and the gold result being dissimilar, generating a semantic error message and recording the natural language utterance, the gold logical form, the database schema information, the inferred logical form, and the semantic error message as a semantic error example, appending a text-to-logical form prompt template with error correction instructions generated based on the semantic error example, to generate an enhanced text-to-logical form prompt template, generating, by the text-to-logical form model, random logical forms based on the enhanced text-to-logical form prompt template, executing each of the random logical forms on the database corresponding to the database schema information to obtain a result for each of the random logical forms, comparing the result for each of the random logical forms to the gold result, when a proportion of the results that are similar to or the same as the gold result based on the comparing is greater than or equal to a predetermined threshold, recording the natural language utterance, the gold logical form, the database schema information, the inferred logical form, the semantic error message, and the error correction instructions as an enhanced semantic error example, and populating the error correction prompt template with the enhanced semantic error example to generate an error correction training example;

training the text-to-logical form model with the set of training examples and the set of error correction training examples to generate a trained text-to-logical form model, wherein the trained text-to-logical form model is capable of performing execution error correction and semantic error correction;

converting, using the trained text-to-logical form model trained to perform the execution error correction and the semantic error correction, an input natural language utterance received from a user, to an output logical form based on the input natural language utterance and database schema information;

executing the output logical form on a database corresponding to the database schema information to obtain a result corresponding to the input natural language utterance; and providing the result corresponding to the input natural language utterance to the user.

2. The computer-implemented method of claim 1., further comprising:

prior to the appending the text-to-logical form prompt template with the error correction instructions, populating an error correction instruction prompt template with the semantic error example to generate an error correction instruction example; and generating, by a large language model, the error correction instructions based on the error correction instruction example.

3. The computer-implemented method of claim 1, wherein:

the training examples in the set of training examples are selected randomly from a batch of text-to-logical form examples; and the set of training examples is a subset of the batch of text-to-logical form examples.

4. The computer-implemented method of claim 1, wherein the text-to-logical form model is a large language model pretrained for a task of converting an input natural language utterance to an output logical form.

5. A system comprising:

one or more processors; and one or more computer-readable media storing instructions which, when executed by the one or more processors, cause the system to perform operations including:

accessing a set of training examples, wherein each training example of the set of training examples comprises a natural language utterance, a gold logical form corresponding to the natural language utterance, and database schema information;

generating a set of error correction training examples based on the set of training examples, wherein generating the set of error correction training examples comprises performing an iterative process for each training example of the set of training examples, and wherein the iterative process includes:

generating, by a text-to-logical form model comprising a deep neural network, an inferred logical form based on the natural language utterance and the database schema information, executing the inferred logical form on a database corresponding to the database schema information, when executing the inferred logical form on the database fails, obtaining an execution error message corresponding to the failure, recording the natural language utterance, the gold logical form, the database schema information, the inferred logical form, and the execution error message as an execution error example, and populating an error correction prompt template with the execution error example to generate an error correction training example, when executing the inferred logical form on the database succeeds, obtaining an inferred result and performing the following:

executing the gold logical form on the database corresponding to the database schema information to obtain a gold result, comparing the inferred result to the gold result to determine whether the inferred result and the gold result are dissimilar, in response to the inferred result and the gold result being dissimilar, generating a semantic error message and recording the natural language utterance, the gold logical form, the database schema information, the inferred logical form, and the semantic error message as a semantic error example, appending a text-to-logical form prompt template with error correction instructions generated based on the semantic error example, to generate an enhanced text-to-logical form prompt template, generating, by the text-to-logical form model, random logical forms based on the enhanced text-to-logical form prompt template, executing each of the random logical forms on the database corresponding to the database schema information to obtain a result for each of the random logical forms, comparing the result for each of the random logical forms to the gold result, when a proportion of the results that are similar to or the same as the gold result based on the comparing is greater than or equal to a predetermined threshold, recording the natural language utterance, the gold logical form, the database schema information, the inferred logical form, the semantic error message, and the error correction instructions as an enhanced semantic error example, and populating the error correction prompt template with the enhanced semantic error example to generate an error correction training example;

training the text-to-logical form model with the set of training examples and the set of error correction training examples to generate a trained text-to-logical form model, wherein the trained text-to-logical form model is capable of performing execution error correction and semantic error correction;

converting, using the trained text-to-logical form model trained to perform the execution error correction and the semantic error correction, an input natural language utterance received from a user, to an output logical form based on the input natural language utterance and database schema information;

executing the output logical form on a database corresponding to the database schema information to obtain a result corresponding to the input natural language utterance; and providing the result corresponding to the input natural language utterance to the user.

6. The system of claim 5, wherein the operations further include:

prior to the appending the text-to-logical form prompt template with the error correction instructions, populating an error correction instruction prompt template with the semantic error example to generate an error correction instruction example; and generating, by a large language model, the error correction instructions based on the error correction instruction example.

7. The system of claim 5, wherein:

the training examples in the set of training examples are selected randomly from a batch of text-to-logical form examples; and the set of training examples is a subset of the batch of text-to-logical form examples.

8. The system of claim 5, wherein the text-to-logical form model is a large language model pretrained for a task of converting an input natural language utterance to an output logical form.

9. One or more non-transitory computer-readable media storing instructions which, when executed by one or more processors, cause a system to perform operations including:

accessing a set of training examples, wherein each training example of the set of training examples comprises a natural language utterance, a gold logical form corresponding to the natural language utterance, and database schema information;

generating a set of error correction training examples based on the set of training examples, wherein generating the set of error correction training examples comprises performing an iterative process for each training example of the set of training examples, and wherein the iterative process includes:

generating, by a text-to-logical form model comprising a deep neural network, an inferred logical form based on the natural language utterance and the database schema information, executing the inferred logical form on a database corresponding to the database schema information, when executing the inferred logical form on the database fails, obtaining an execution error message corresponding to the failure, recording the natural language utterance, the gold logical form, the database schema information, the inferred logical form, and the execution error message as an execution error example, and populating an error correction prompt template with the execution error example to generate an error correction training example, when executing the inferred logical form on the database succeeds, obtaining an inferred result and performing the following:

executing the gold logical form on the database corresponding to the database schema information to obtain a gold result, comparing the inferred result to the gold result to determine whether the inferred result and the gold result are dissimilar, in response to the inferred result and the gold result being dissimilar, generating a semantic error message and recording the natural language utterance, the gold logical form, the database schema information, the inferred logical form, and the semantic error message as a semantic error example, appending a text-to-logical form prompt template with error correction instructions generated based on the semantic error example, to generate an enhanced text-to-logical form prompt template, generating, by the text-to-logical form model, random logical forms based on the enhanced text-to-logical form prompt template, executing each of the random logical forms on the database corresponding to the database schema information to obtain a result for each of the random logical forms, comparing the result for each of the random logical forms to the gold result, when a proportion of the results that are similar to or the same as the gold result based on the comparing is greater than or equal to a predetermined threshold, recording the natural language utterance, the gold logical form, the database schema information, the inferred logical form, the semantic error message, and the error correction instructions as an enhanced semantic error example, and populating the error correction prompt template with the enhanced semantic error example to generate an error correction training example;

training the text-to-logical form model with the set of training examples and the set of error correction training examples to generate a trained text-to-logical form model, wherein the trained text-to-logical form model is capable of performing execution error correction and semantic error correction;

converting, using the trained text-to-logical form model trained to perform the execution error correction and the semantic error correction, an input natural language utterance received from a user, to an output logical form based on the input natural language utterance and database schema information;

executing the output logical form on a database corresponding to the database schema information to obtain a result corresponding to the input natural language utterance; and providing the result corresponding to the input natural language utterance to the user.

10. The one or more non-transitory computer-readable media of claim 9, wherein the operations further include:

prior to the appending the text-to-logical form prompt template with the error correction instructions, populating an error correction instruction prompt template with the semantic error example to generate an error correction instruction example; and generating, by a large language model, the error correction instructions based on the error correction instruction example.

11. The one or more non-transitory computer-readable media of claim 9, wherein:

the training examples in the set of training examples are selected randomly from a batch of text-to-logical form examples; and the set of training examples is a subset of the batch of text-to-logical form examples.

* * * * *